US008634862B2

(12) United States Patent
Libonati et al.

(10) Patent No.: US 8,634,862 B2
(45) Date of Patent: Jan. 21, 2014

(54) CROSS-ARCHITECTURE FLIGHT TRACKING SYSTEM

(75) Inventors: Antonietta Libonati, Rome (IT); Luigi Esposito, San Felice a Cancello (IT); Nico Vassallo, Fontana Liri (IT)

(73) Assignee: Accenture Global Services Limited, Dublin (IE)

( * ) Notice: Subject to any disclaimer, the term of this patent is extended or adjusted under 35 U.S.C. 154(b) by 907 days.

(21) Appl. No.: 12/185,523

(22) Filed: Aug. 4, 2008

(65) Prior Publication Data

US 2010/0029254 A1    Feb. 4, 2010

(51) Int. Cl.
*H04W 4/00*    (2009.01)

(52) U.S. Cl.
USPC ............ 455/466; 455/412.3; 455/412.4; 455/431; 455/456.1; 709/206; 709/207; 709/218; 709/219; 340/963; 340/988

(58) Field of Classification Search
USPC .......... 455/412.1, 412.2, 414.1, 414.4, 431, 455/456.1–457, 466, 550.1, 556.1, 556.2, 455/566; 709/204, 206, 207, 216–219; 705/1.1, 5; 340/963, 988
See application file for complete search history.

(56) References Cited

U.S. PATENT DOCUMENTS

| | | | | |
|---|---|---|---|---|
| 6,040,781 | A * | 3/2000 | Murray | 340/4.31 |
| 7,119,716 | B2 * | 10/2006 | Horstemeyer | 340/994 |
| 7,548,756 | B2 * | 6/2009 | Velthuis et al. | 455/466 |
| 7,603,281 | B1 * | 10/2009 | Miller et al. | 705/1.1 |
| 7,689,234 | B2 * | 3/2010 | Horvath et al. | 455/466 |
| 7,792,634 | B2 * | 9/2010 | Young | 701/120 |
| 2002/0024947 | A1 * | 2/2002 | Luzzatti et al. | 370/352 |
| 2002/0118809 | A1 * | 8/2002 | Eisenberg | 379/202.01 |
| 2003/0046296 | A1 | 3/2003 | Doss et al. | |
| 2003/0074410 | A1 * | 4/2003 | Kay et al. | 709/206 |
| 2003/0218631 | A1 * | 11/2003 | Malik | 345/739 |
| 2003/0233244 | A1 * | 12/2003 | Kumhyr | 705/1 |
| 2004/0038688 | A1 * | 2/2004 | Zabawshyj et al. | 455/456.3 |
| 2004/0203854 | A1 | 10/2004 | Nowak | |
| 2006/0161626 | A1 * | 7/2006 | Cardina et al. | 709/206 |
| 2007/0067385 | A1 | 3/2007 | D'Angelo et al. | |
| 2007/0123253 | A1 | 5/2007 | Simongini et al. | |

(Continued)

FOREIGN PATENT DOCUMENTS

| | | |
|---|---|---|
| CN | 101051922 | * 10/2007 |
| CN | 101051922 A | 10/2007 |

(Continued)

OTHER PUBLICATIONS

English Translation of CN101051922—STIC 2600—retrieved Sep. 19, 2013.*

(Continued)

*Primary Examiner* — Mahendra Patel
*Assistant Examiner* — Quan M Hua
(74) *Attorney, Agent, or Firm* — Brinks Gilson & Lione

(57) ABSTRACT

A cross-architecture flight tracking system helps an individual keep track of the status of an airline flight. A subscriber receives status updates intelligently and in real time based on the individual's accessibility over an instant messaging client. The system facilitates the status updates by maintaining and listing the flight as a contact in the individual's instant messaging client contact list, processing status updates from the airline, and dynamically passing the status updates to the subscriber through a channel that will successfully deliver the message.

20 Claims, 17 Drawing Sheets

(56) References Cited

U.S. PATENT DOCUMENTS

| | | |
|---|---|---|
| 2007/0192410 A1 | 8/2007 | Liversidge et al. |
| 2007/0194940 A1* | 8/2007 | Valluru .................. 340/573.4 |
| 2009/0061824 A1* | 3/2009 | Neelakantan et al. ..... 455/412.1 |
| 2009/0100145 A1* | 4/2009 | Szeto et al. .................. 709/217 |
| 2009/0276250 A1* | 11/2009 | King et al. ........................ 705/5 |
| 2009/0287701 A1* | 11/2009 | Breaker et al. .................... 707/7 |

FOREIGN PATENT DOCUMENTS

| | | |
|---|---|---|
| EP | 0 948 160 A2 | 10/1999 |
| EP | 1 372 095 A1 | 12/2003 |
| WO | WO 01/45343 A2 | 6/2001 |
| WO | WO 03/049459 A1 | 6/2003 |
| WO | WO 2004/114662 A1 | 12/2004 |
| WO | WO 2005/010678 A2 | 2/2005 |

OTHER PUBLICATIONS

Extended European Search Report for European Patent Application No. 09006917.0-2221, mailed Aug. 25, 2009.

* cited by examiner

CROSS-ARCHITECTURE FLIGHT TRACKING SYSTEM

BACKGROUND OF THE INVENTION

1. Technical Field

This disclosure relates to the communication of object information, and in particular relates to the relaying of flight status information to an instant messaging client for display to a subscriber.

2. Related Art

Even as the world's population continues to expand, our ability to communicate with one another and exchange ideas brings us closer together. These avenues for communication also bring the world's information within the reach of our fingertips. Different technologies have been developed to take advantage of a need for an individual to be connected. Many individuals utilize multiple, different technologies to maintain their connectedness. With the plethora of technology available, a need exists for getting the right information in the right manner to the right individual.

SUMMARY

A cross-architecture flight tracking system helps an individual keep track of the status of an airline flight. A subscriber receives status updates intelligently and in real time based on the individual's accessibility over an instant messaging client. The system facilitates the status updates by maintaining and listing the flight as a contact in the individual's instant messaging client contact list, processing status updates from the airline, and dynamically passing the status updates to the subscriber through a channel that will successfully deliver the message.

Other systems, methods, features and advantages will be, or will become, apparent to one with skill in the art upon examination of the following figures and detailed description. All such additional systems, methods, features and advantages are included within this description, are within the scope of the claimed subject matter, and are protected by the following claims.

BRIEF DESCRIPTION OF THE DRAWINGS

The system may be better understood with reference to the following drawings and description. The elements in the figures are not necessarily to scale, emphasis instead being placed upon illustrating the principles of the system. In the figures, like-referenced numerals designate corresponding parts throughout the different views.

DETAILED DESCRIPTION OF THE PREFERRED EMBODIMENTS

Figure 1:
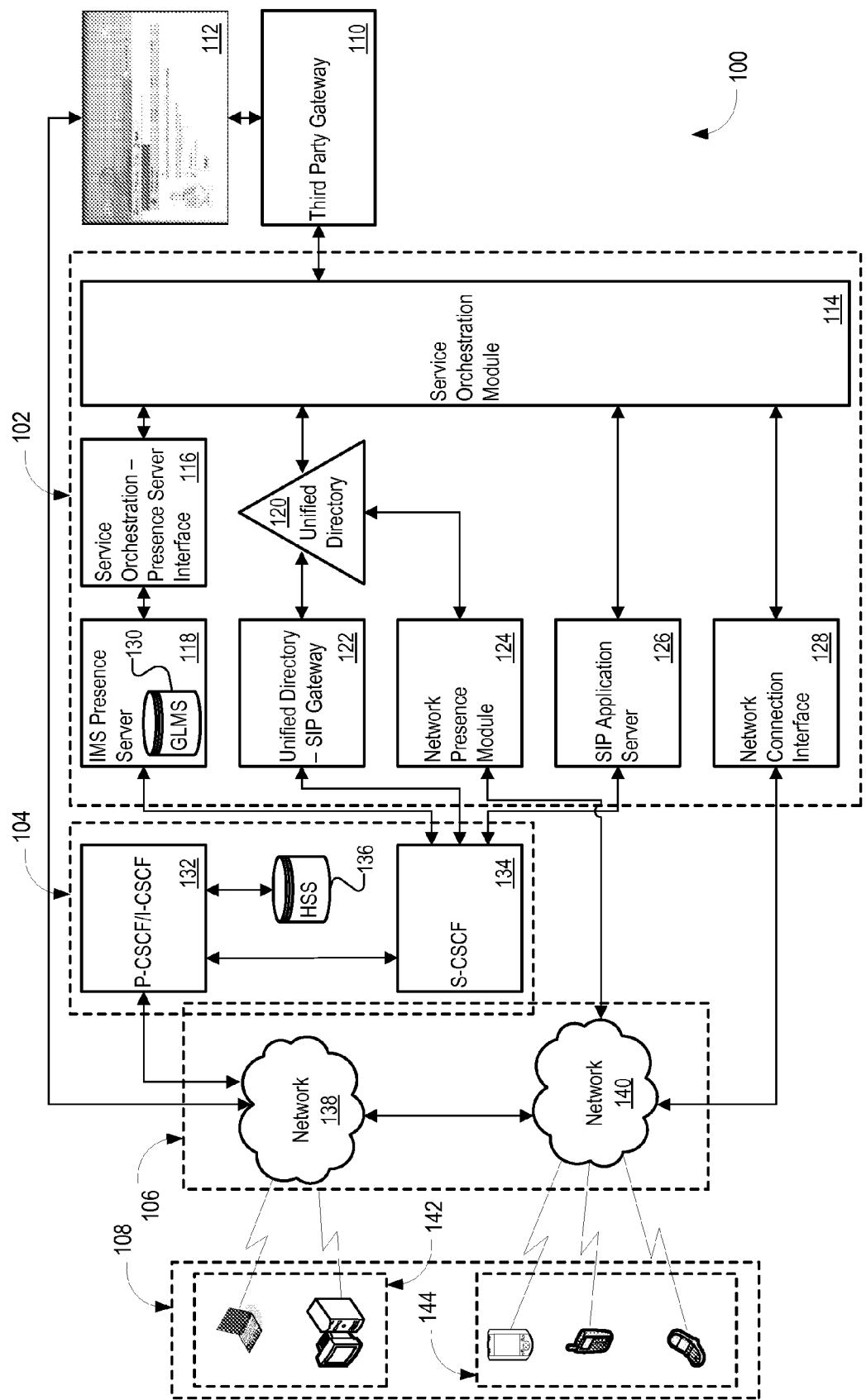
FIG. 1 shows a cross-architecture flight tracking architecture.

FIG. 1 shows a cross-architecture flight tracking architecture 100. The architecture 100 includes a legacy telecommunications network (LTN) 102, a notification system extension (NSE) 104 to the LTN, a communications network 106, and subscriber endpoints (SE) 108. The LTN 102 may communicate with a third-party gateway 110. The third-party gateway 110 may communicate with a third party client 112. The third party client 112 may be an airline computer system, including, as examples, a reservation system, flight status system, passenger assignment system, or other airline processing system. As additional examples, the airline computer system may be an airline's web server, a terminal operated by an airline representative, or any other third-party input source. The third party client 112 may be in communication with a subscriber through the communications network 106. For example, the third party client may receive instructions from the subscriber, reformat the instructions from the subscriber, and forward the reformatted instructions to the third party gateway 110. The third-party gateway 110 may be internal or external to the LTN 102.

The legacy telecommunications network 102 includes a service orchestration (SO) module 114, a SO-presence server (SO-PS) interface 116, an internet protocol (IP) multimedia subsystem (IMS) presence server 118 as an exemplary legacy presence server, a unified directory (UD) 120, a UD-session initiation protocol (SIP) gateway 122, a network presence module 124, a SIP application server (SIP AS) 126, and a network connection interface 128. Each of these components may be in communication with each of the other components, either through the SO 114 or independent of the SO 114. The SO 114 communicates with the third party gateway 110. The LTN 102 may include a service delivery platform (SDP) or an architecture that emulates SDP functions. Such functions may include translating events to and from canonical formats and standardized messages, as well as processing service requests to and from applications to individual network nodes and service platforms.

The SO 114 may orchestrate communications and message translations between applications, network nodes, and/or service platforms. The SO-presence server interface 116 may perform communications translations between the SO 114 and the IMS presence server 118. For example, the SO-presence server interface 116 may be a presence watcher (Pw) network gateway (Pw NGW). The SO-presence server interface 116 may also include an extensible markup language (XML) configuration access protocol (XCAP) network gateway (XCAP NGW). The XCAP NGW may perform communications translations between the SO 114, the Pw NGW, or any of the other LTN modules and a group list management server (GLMS) 130.

The IMS presence server 118 executes and controls services based on the internet protocol (IP) protocol, as well as manages NSE presence information. NSE presence information may include IMS presence information. A group list management server (GLMS) 130 may be internal to the IMS presence server 118. Alternatively, the GLMS 130 may be external to and in communication with the IMS presence server 118. The GLMS 130 may store a subscriber's contact list and perform functions such as adding, editing, and deleting groups and contacts from the subscriber's contact list.

The unified directory 120 stores subscriber information such as legacy subscriber profile information and legacy subscriber presence information. The UD 120 may communicate with the NSE 104 through the UD-SIP gateway 122, a SE 108 through the network presence module 124, and/or the SO 114. Hence, the UD-SIP gateway 122 may be an exemplary gateway operable to accept a flight tracking request.

The UD-SIP gateway 122 exposes the UD 120 to the NSE 104. The UD-SIP gateway 122 may include an IMS service control (ISC) network gateway (ISC NGW). The ISC NGW may translate SIP messages from the NSE 104 to hypertext transfer protocol (HTTP) requests for the UD 120 or SO 114, and vice versa.

The network presence module 124, as an exemplary legacy network presence register or part of an exemplary legacy network presence register, manages presence information for any or all the legacy SEs 144. The network presence module 124 may include a notification agent (NA). The NA may manage incoming presence information from a legacy SE 144. The NA may also choose the right channel to send information to a subscriber, e.g. via the NSE 104 or through a legacy communication channel, such as the network connection interface 128.

The network presence module 124 may also include a presence network agent (PNA). The PNA may be in communication with the IMS presence server 118 and the GLMS 130. The PNA as an exemplary legacy network presence register or part of an exemplary legacy network presence register may gather legacy subscriber presence status information from a legacy SE 144 and publish this information on the IMS presence server. The PNA may query presence status information from legacy subscribers according to the interface capability provided by the legacy network. The legacy presence status information may be stored in and retrieved from the unified directory 120 as an exemplary legacy network presence register or part of an exemplary legacy network presence register.

The SIP AS 126 communicates with the NSE 104, for example, to send instant messages to an IMS-enabled SE 108. The network communication interface 128 communicates with legacy SE 108 through the network 106. A legacy SE 144 may be identified by a mobile subscriber integrated services digital network (MSISDN) number or a broadband/internet protocol (IP) television (IPTV) subscriber identification, such as an e-mail address.

The notification system extension 104 includes call session control functions (CSCF), such as a proxy-CSCF (P-CSCF) and an interrogating-CSCF (I-CSCF) 132, as well as a serving-CSCF (S-CSCF) 134. The NSE 104 also includes a home subscriber server (HSS) 136. The P-CSCF/I-CSCF 132 sits on the path of all signaling messages, has the ability to inspect those messages, and authenticates subscribers. The S-CSCF 134 handles SIP registrations, sits on the path of all signaling messages, has the ability to inspect those messages, decides which application servers (AS) to forward SIP messages, and routes messages. The S-CSCF may be an exemplary subscriber service or part of an exemplary subscriber service. The HSS 136 is a master database that supports the other NSE components. The HSS 136 may store subscription-related information, such as subscriber profiles. The HSS 136 may be an exemplary subscriber service or part of an exemplary subscriber service. The NSE 104 may include other IMS control elements and/or be an IMS control system.

The communications network 106 may include an IMS-enabled network 138 and a legacy network 140. The communications network 106 may include an XDSL network, an IP network, and/or a mobile network, or combinations thereof. The communications network 106 may include wired networks, wireless networks, or combinations thereof. The wireless network may be a cellular telephone network using data networking standards such as 1×RTT, UMTS, HSDPA, EDGE, or EVDO, or an 802.11, 802.11b, 802.11g, 802.11n, 802.16, or 802.20 network. Further, the network 106 may be a public network, such as the Internet, a private network, such as an intranet, or combinations thereof, and may utilize a variety of networking protocols now available or later developed including, but not limited to TCP/IP based networking protocols. Information provided by the network 106 may be accessed through web browsers or mobile web browsers. The browser may be the MICROSOFT™ INTERNET EXPLORER™ browser, MOZILLA™ FIREFOX™ browser, APPLE™ SAFARI™ browser, MICROSOFT™ POCKET INTERNET EXPLORER (POCKET IE)™ browser, OPERA™ MINI™ browser, ACCESS™ NETFRONT™ browser, PALM™ BLAZER™ browser, NOKIA™ MINI MAP™ browser, CINGULAR™ MEDIA NET™ access, BLACKBERRY™ browser, or THUNDERHAWK™ browser.

The network 106 may include wide area networks (WAN), such as the internet, local area networks (LAN), campus area networks, metropolitan area networks, or any other networks that may allow for data communication. The network 106 may be divided into sub-networks. The sub-networks may allow access to all of the other components connected to the network 106, or the sub-networks may restrict access between the components connected to the network 106. The network 106 may be regarded as a public or private network connection and may include, for example, a virtual private network or an encryption or other security mechanism employed over the public Internet, or the like.

The subscriber endpoints (SE) 108 may include IMS-enabled clients 142 and non-IMS compatible clients, e.g. legacy SE 144. IMS-enabled clients 142 may include systems capable of running instant messaging applications. Legacy SE 144 may include global system for mobile communications (GSM) phones and/or broadband/IPTV subscribers.

Figure 2:
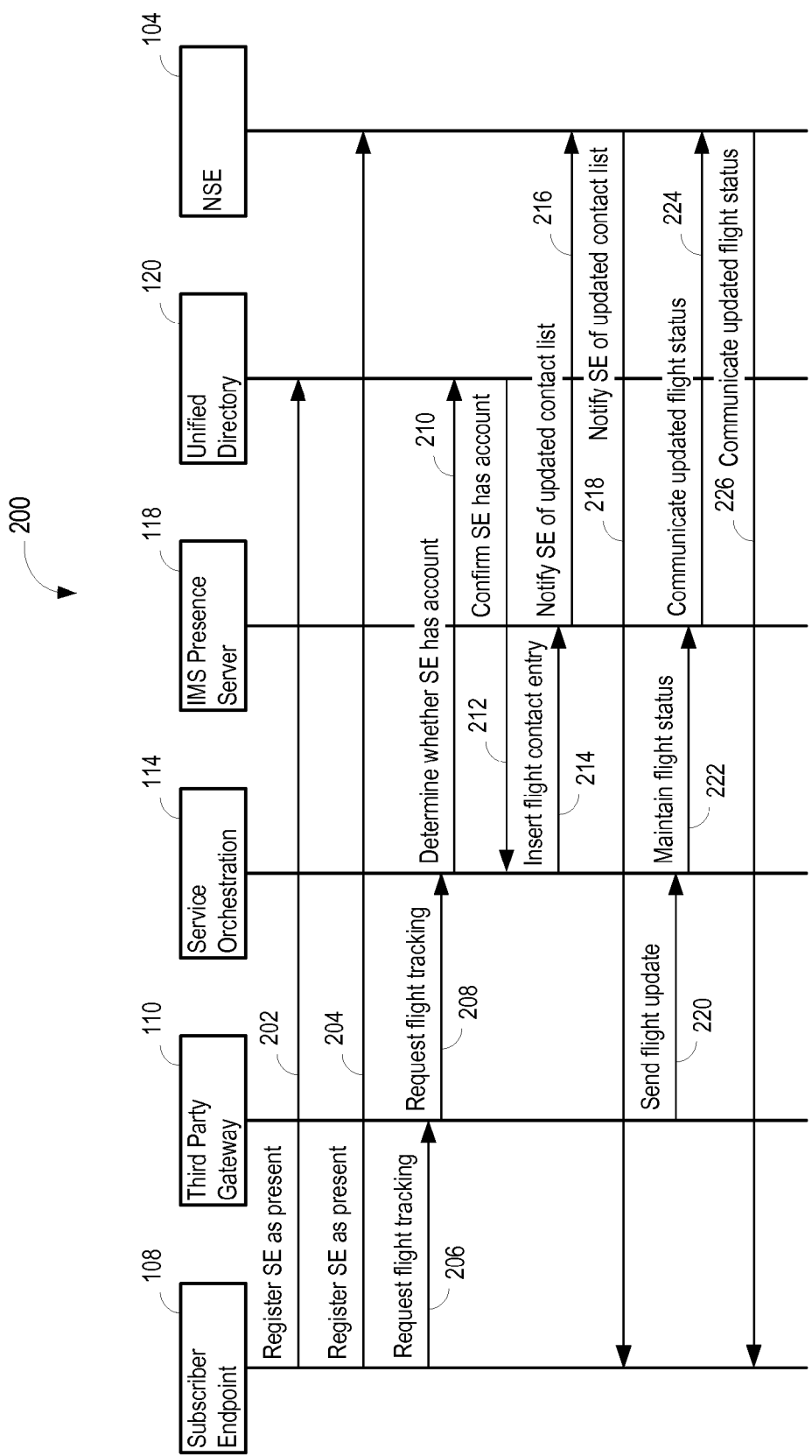
FIG. 2 shows a flight object creation flow, a contact list update message flow, and a flight status update message flow.

FIG. 2 shows a flight entry object creation flow, a contact list update message flow, and a flight status update message flow 200. The SE 108 sends a message to the UD 120 notifying the UD 120 to register the SE 108 as present and available (202). This message may be sent through the network 106 and the network presence module 124. The SE 108 may also send a message to the NSE 104 to register the SE 108 as present and available (204). The second registration 204 may occur, for example, when the SE 108 is running an IMS-enabled client, such as an instant messaging application.

The subscriber may desire to subscribe to and issue a flight tracking subscription command to subscribe to a flight tracking feature upon, or subsequent to, an airline seat reservation. The subscriber instructs the SE 108 to communicate a flight tracking subscription command to the third party gateway 110 (206). The third party gateway 110 may be an exemplary gateway operable to accept a flight tracking request. For example, the SE 108 may issue a command to the airline service, and the airline service may forward that request to the third party gateway 110. Alternatively, the SE 108 may provide a command directly to the third party gateway 110. The third party gateway 110 then forwards that request to the SO 114 (208). The SO 114 may optionally determine whether the SE 108 or the subscriber associated with the SE 108 has an account with the UD (210). The UD 120 may confirm that the SE 108 or subscriber has an account (212) or deny that an account exists.

The SO 114 then requests the IMS presence server 118 to insert a flight contact entry, e.g. a flight contact object, into the subscriber's contact list. For example, the IMS presence server 118 may add the flight contact entry into a subscriber contact list stored in the GLMS 130. The flight contact entry may include flight identifiers and/or flight status information, such as a flight number, airline name, time and date of departure, terminal number, gate number, and/or seat number.

Once the IMS presence server creates the flight contact entry in the subscriber's contact list, the IMS presence server notifies the SE 108 of the updated contact list. For example, the IMS presence server sends the notification message to the NSE 104 (216). The NSE 104 then converts and sends the notification message to the SE 108 (218). The SE 108 may then retrieve the updated contact list.

An airline may desire to notify the subscriber of changes of flight status. The airline may communicate to the third party gateway 110 flight status update information. The flight status update information may indicate a preference for a passive notification. A passive notification may include an update to the status message in a contact list. The third party gateway 110 then communicates the flight status update information to the SO 114 (220). The SO 114 then communicates the flight status update information to the IMS presence server 118 (222). The IMS presence server may then update the status information for the flight object. For example, the IMS presence server may update the status information for the flight contact entry of a subscriber contact list stored in the GLMS 130. The IMS presence server 118 then notifies the SE 108 of the updated flight status. For example, the IMS presence server 118 communicates the updated flight status information to the NSE 104 (224). The NSE 104 may then convert and send the updated flight status information to the SE 108 (226). The SE 108 may then display the updated flight status information as status information associated with a contact within a contact list display.

Figure 3:
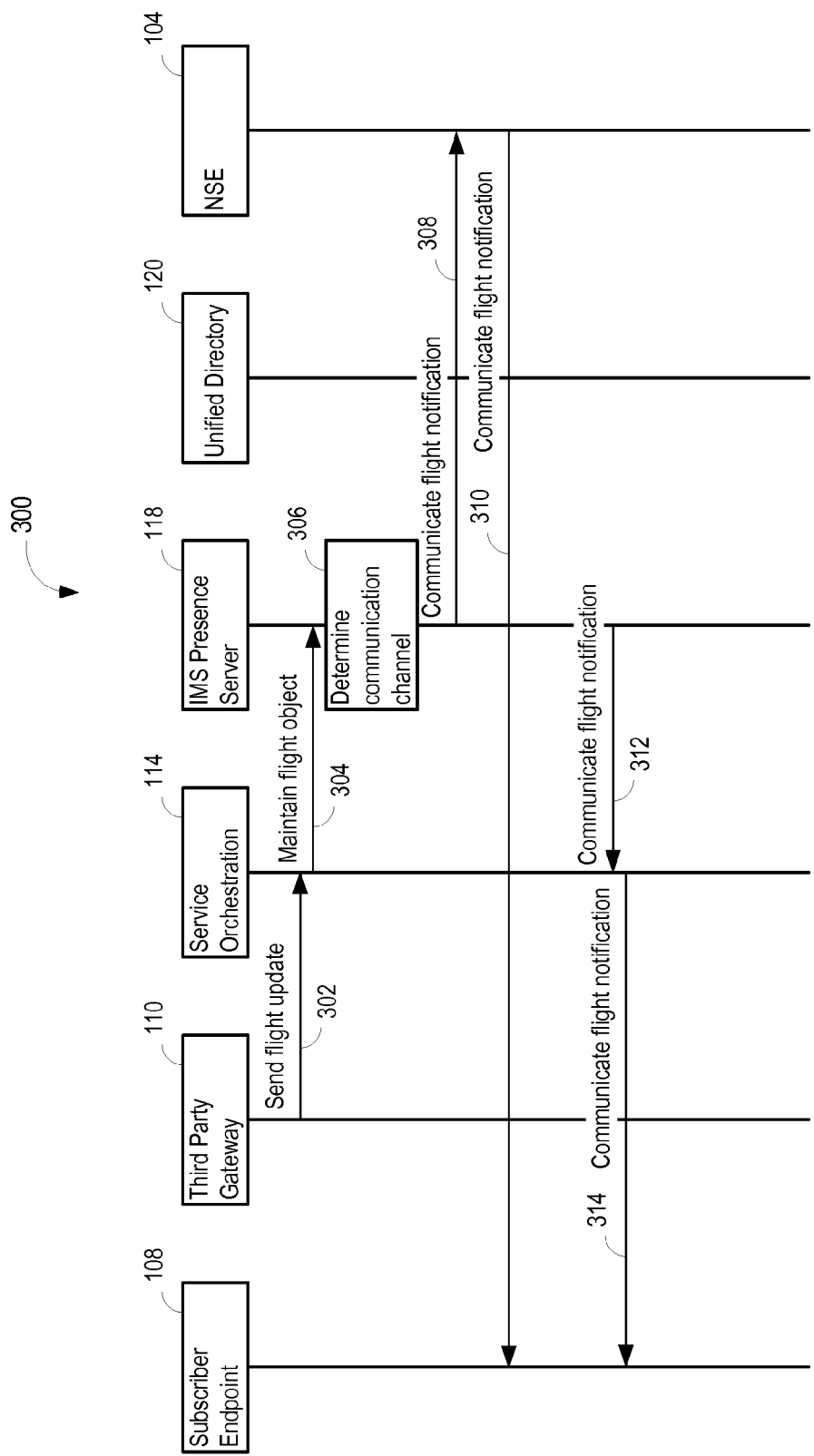
FIG. 3 shows a flight status notification message flow.

FIG. 3 shows a flight status notification message flow 300. An airline may desire to actively notify the subscriber of changes of flight status. The airline may communicate to the third party gateway 110 the flight status update information. The flight status update information may include a preference for active notification. An active notification may include a pop-up instant message window containing a message. The third party gateway 110 communicates the flight status update information to the SO 114 (302). The SO 114 communicates the flight status update information to the IMS presence server 118 (304). The IMS presence server may update the status information for the flight object. For example, the IMS presence server may update the status information for the flight contact entry of a subscriber contact list stored in the GLMS 130.

The IMS presence server 118 may determine which communication channel to use to actively notify the SE 108 of the updated flight status (306). For example, the IMS presence server 118 may determine whether the SE 108 is registered as present with the IMS presence server. If the SE 108 is registered as present with the IMS presence server 118, the IMS presence server 118 may decide to send the flight status notification through the NSE 104. If the SE 108 is not registered as present with the IMS presence server 118, the IMS presence server 118 may decide to send the flight status notification through an alternative communication channel.

The IMS presence server 118 may communicate the updated flight status information to the NSE 104 (308). The NSE 104 may convert and send the updated flight status information to the SE 108 (310). The SE 108 may actively display the updated flight status information, e.g. through an instant message pop-up window. Alternatively or additionally, the IMS presence server 118 may communicate the updated flight status information to the SO 114 (312). The SO 114 may convert and send the updated flight status information to the SE 108 (314). For example, the SO 114 may send the updated flight status information through the network communication interface 128 to a legacy network infrastructure 140. The SE 108 may then actively display the updated flight status information, e.g., as a short message service (SMS) text message.

Figure 4:
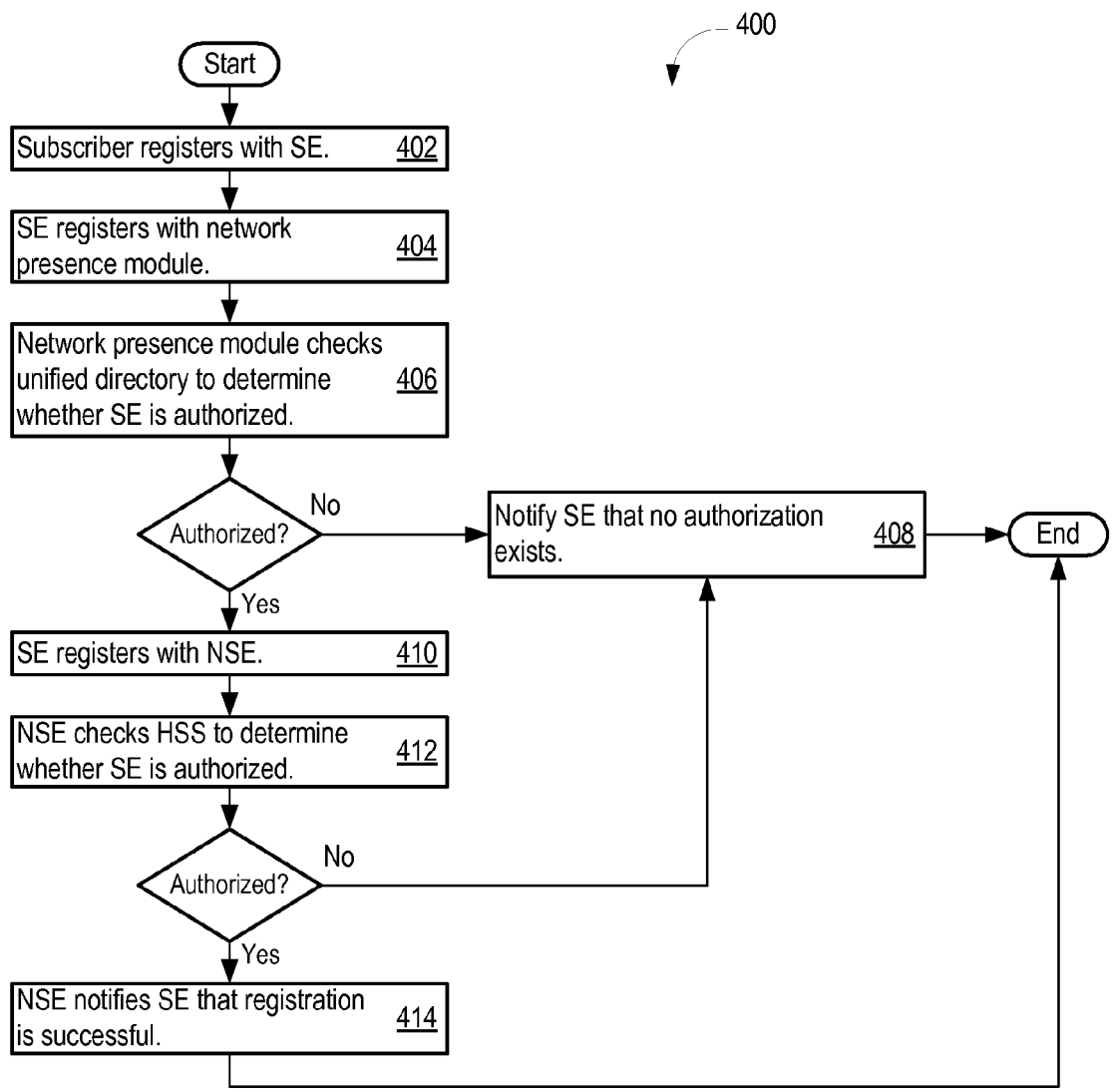
FIG. 4 shows a subscriber registration flow diagram.

FIG. 4 shows a subscriber registration flow diagram 400. A subscriber first registers with a SE 108 (402). For example, the subscriber may log in to a terminal, and once authenticated by the terminal, the subscriber may then log in to an instant messaging application and/or an instant messaging server. Alternatively, a subscriber may initialize a SE 108, and the SE 108 may register with a network. The subscriber may register with more than one SE 108. For example, a subscriber may register through an instant messaging client and through a GSM phone.

The SE 108 registers with a network presence module 124 (404). This registration informs the LTN 102 that the SE 108 is available for communication through the communication network 106. The network presence module 124 communicates with the UD 120 to determine whether the SE 108 is authorized (406). For example, the network presence module 124 may check with the UD 120 to see if the SE 108 has an account with the LTN 102. If the SE is not authorized, the network presence module 124 notifies the SE 108 that they are not authorized to use the LTN services (408).

If the SE 108 is authorized, the SE 108 may optionally register with the NSE 104 (410). This registration may occur, for example, when the SE 108 is running an IMS compatible client, such as an instant messaging application. The NSE 104 checks with the HSS 136 to determine whether the SE 108 is authorized (412). If the check determines that the SE 108 is authorized, the NSE 104 acknowledges that the SE 108 is authorized (414). If the SE 108 is not authorized, then the NSE 104 notifies the SE 108 of the failure (408).

Figure 5:
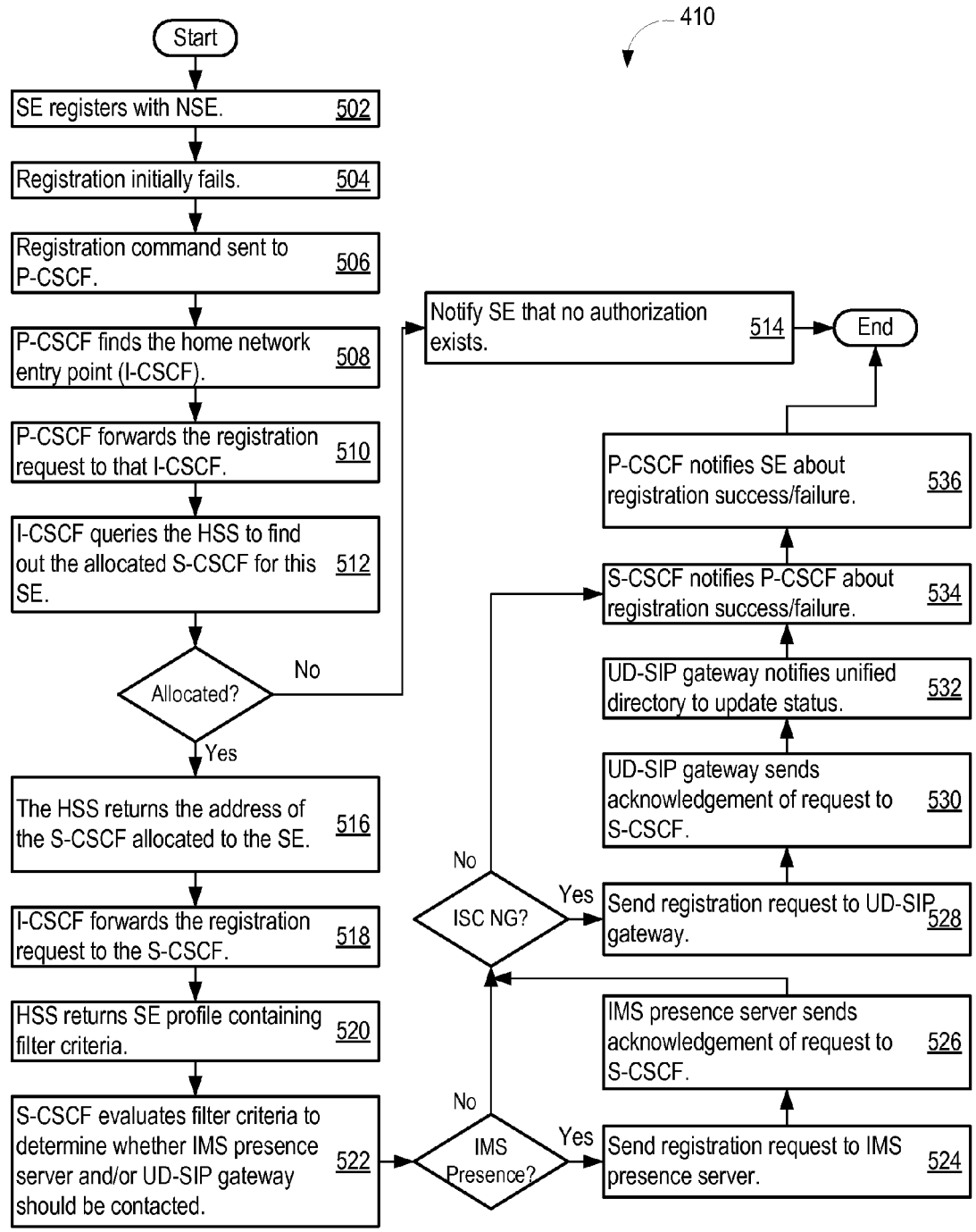
FIG. 5 shows an NSE subscriber registration flow diagram.

FIG. 5 shows an NSE subscriber registration flow diagram 410. The SE 108 first attempts to register with the NSE 104 (502). The initial registration attempt may fail (504). The SE 108 then sends a registration command to the NSE 104 (506). The registration command may be sent to the P-CSCF. The P-CSCF then finds the home network entry point (508). The home network entry point may be the I-CSCF. The P-CSCF then forwards the registration request to that I-CSCF (510). The I-CSCF queries the HSS 136 to find the allocated S-CSCF 134 for the SE 108 (512). If no S-CSCF 134 is allocated, or if the SE 108 is otherwise not authorized for the NSE 104, the NSE 104 notifies the SE 108 that authorization does not exist (514).

If a S-CSCF 134 is allocated, or if the SE 108 is otherwise authorized for the NSE 104, then the HSS 136 returns the address of the S-CSCF 134 allocated to the SE 108 (516). The I-CSCF forwards the registration request to the S-CSCF 134 (518). The HSS 136 also returns to the I-CSCF a profile containing filter criteria corresponding to the SE 108 (520).

The I-CSCF forwards the profile to the S-CSCF 134. The S-CSCF 134 evaluates the filter criteria to determine whether the IMS presence server 118 and/or the UD-SIP gateway 122 should be contacted (522).

If the IMS presence server 118 should be contacted, the S-CSCF 134 creates a new registration request and sends the new registration request to the IMS presence server 118 (524). The IMS presence server may then acknowledge the request (526). If the UD-SIP gateway 122 should be contacted, the S-CSCF 134 creates a new registration request and sends the new registration request to the UD-SIP gateway 122 (528). The UD-SIP gateway 122 may then acknowledge the request (530). The UD-SIP gateway 122 may then notify the UD 120 of the registration of the SE 108 (532). The S-CSCF 134 may then notify the P-CSCF about the registration success or failure (534). The P-CSCF may then notify the SE 108 about the registration success or failure (536).

Figure 6:
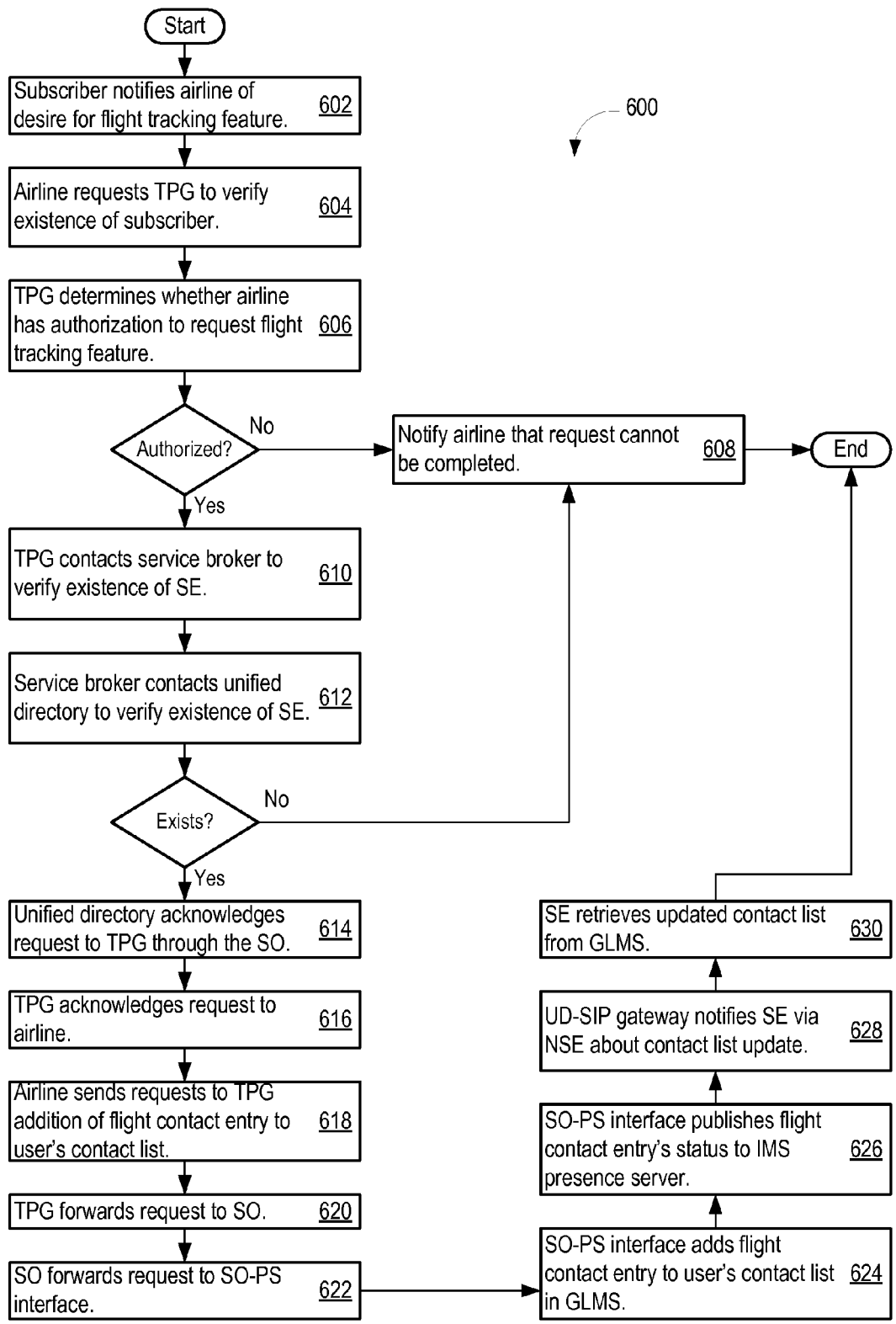
FIG. 6 shows a flight entry object creation flow diagram.

FIG. 6 shows a flight object creation flow diagram 600. A subscriber notifies an airline about their desire to subscribe to a flight tracking feature (602). The airline requests the third party gateway 110 to verify that the subscriber has an account through which the flight tracking feature may be implemented (604). The TGP 110 may determine whether the airline has authorization to request the flight tracking feature for the subscriber (606). If the airline is not authorized then the TGP notifies the airline that the request cannot be completed (608).

If the airline is authorized then the TPG 110 contacts a service broker to verify that the SE 108 has an associated account with the LTN 102 (610). For example, the TGP 110 may communicate with the SO 114 to request the verification. The service broker contacts the UD 120 for the verification (612). If the UD 120 is unable to verify the existence of an account associated with the SE 108, then the TGP 110 notifies the airline that the request cannot be completed (608). If an account exists, then the UD 120 acknowledges the request to the TPG 110 (614). The TPG 110 then passes the acknowledgement to the airline (616).

The airline may send a request to the TPG 110 for the addition of a flight contact object entry to the subscriber's contact list (618). This request may be performed after or concurrently with the initial request to verify the existence of the subscriber 614. The TPG 110 forwards the request to the SO 114 (620). The SO forwards the request to the SO-presence server interface 116 (622). The SO-presence server interface 116 adds the flight contact object entry to the subscriber's contact list in the GLMS 118 (624). For example, the XCAP NGW may receive the request from the SO 114 and communicate the addition of the flight contact object entry to the GLMS 118.

The SO-presence server interface publishes status of the flight contact object entry to the IMS presence server 118 (626). For example, the Pw NGW may receive notification from the XCAP NGW of the addition of the flight contact object entry, and the Pw NGW may notify the IMS presence server 118 of the updated flight status. The UD-SIP gateway 122 may then notify the SE 108 about the contact list update (628). For example, the SO-presence server may notify the UD-SIP gateway 122 of the contact list update with an instruction to relay the information to the SE 108. The UD-SIP gateway 122 may notify the SE 108 through the NSE 104. The SE 108 may then request and retrieve the updated contact list from the GLMS 118 (630).

Figure 7:
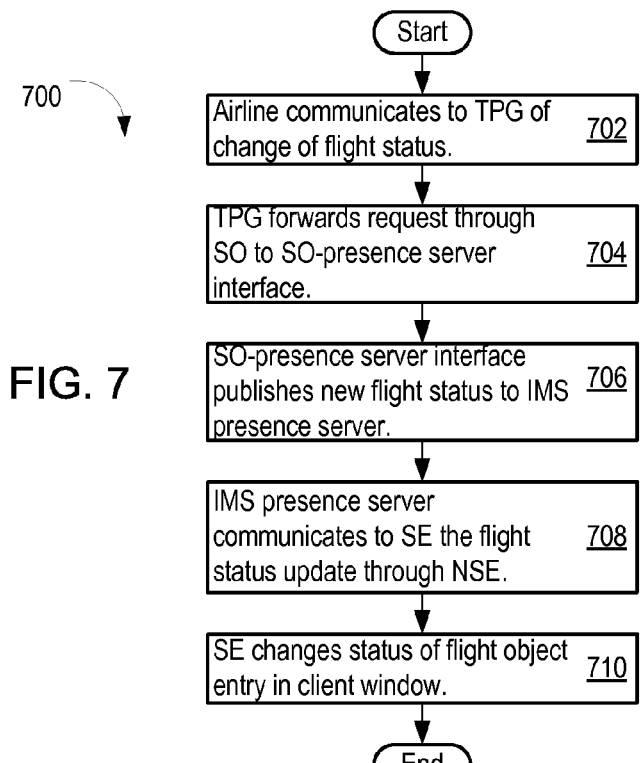
FIG. 7 shows a flight status update message flow diagram.

FIG. 7 shows a flight status update message flow diagram 700. An airline communicates with the TPG 110 of a flight status change (702). The TGP 110 forwards the flight status change information through the SO 114 to the SO-presence server interface 116 (704). For example, the request may be forwarded to the Pw NGW. The SO-presence server interface 116 publishes the flight status to the IMS presence server 118 (706). For example, the Pw NGW may publish the status. The IMS presence server 118 then communicates to the SE 108 the flight status update (708). The communication may be performed through the NSE 104. The SE 108 may change the status of the flight object entry (710). For example, the SE 108 may update a status message within a client window displaying a rendering of the subscriber's contact list.

Figure 8:
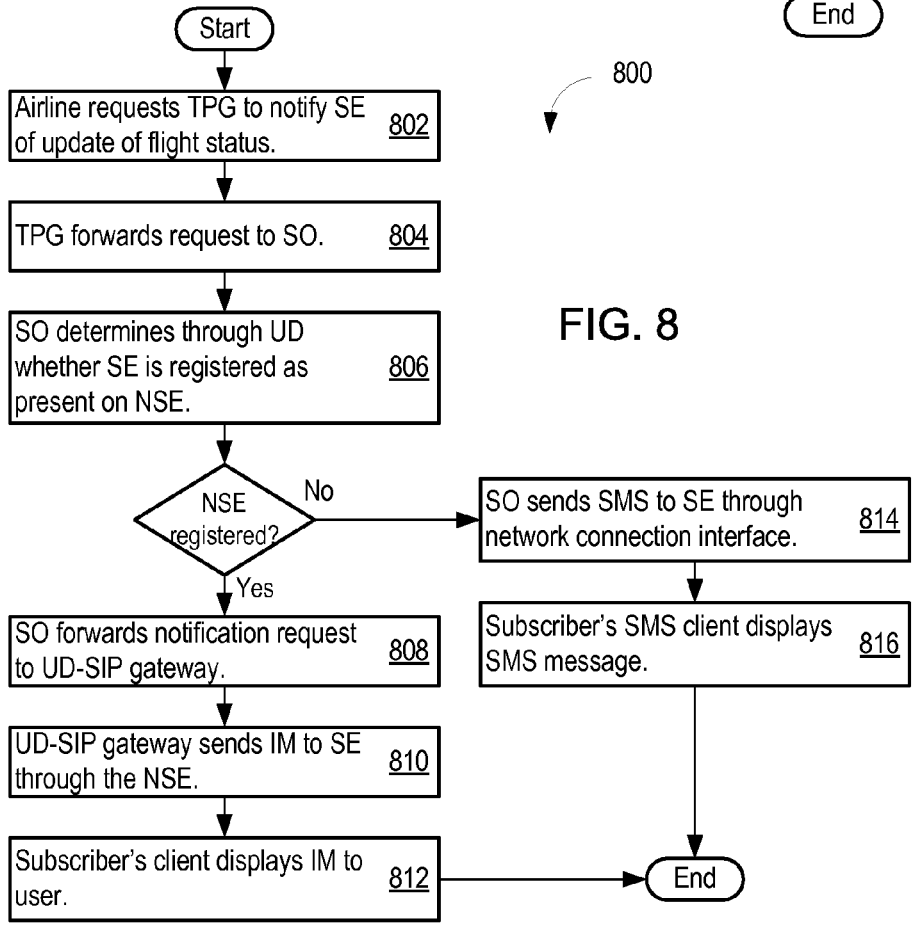
FIG. 8 shows a flight status notification message flow diagram.

FIG. 8 shows a flight status notification message flow diagram 800. The airline sends a request to the TPG 110 to notify the SE 108 of a flight status update (802). The TPG 110 forwards the request to the SO 114 (804). The SO 114 checks with the UD 120 to determine whether the SE 108 is present through the NSE 104 (806). If the SE 108 is present through the NSE 104, then the SO forwards the flight status update notification to the UD-SIP gateway 122 (808). The UD-SIP gateway converts the information to an instant message notification and sends the notification to the SE 108 through the NSE 104 (810). When the SE 108 receives the instant message notification, the SE 108 may cause the subscriber's client to open an instant message window and display the flight status update information (812). If the SE 108 is not present through the NSE 104, then the SO 114 may convert the information to an SMS text message and send the message to the SE 108 through the network connection interface 128 (814). When the SE 108 receives the SMS text message, the SE 108 may cause the subscriber's client to display the SMS text message (816).

Figure 9:
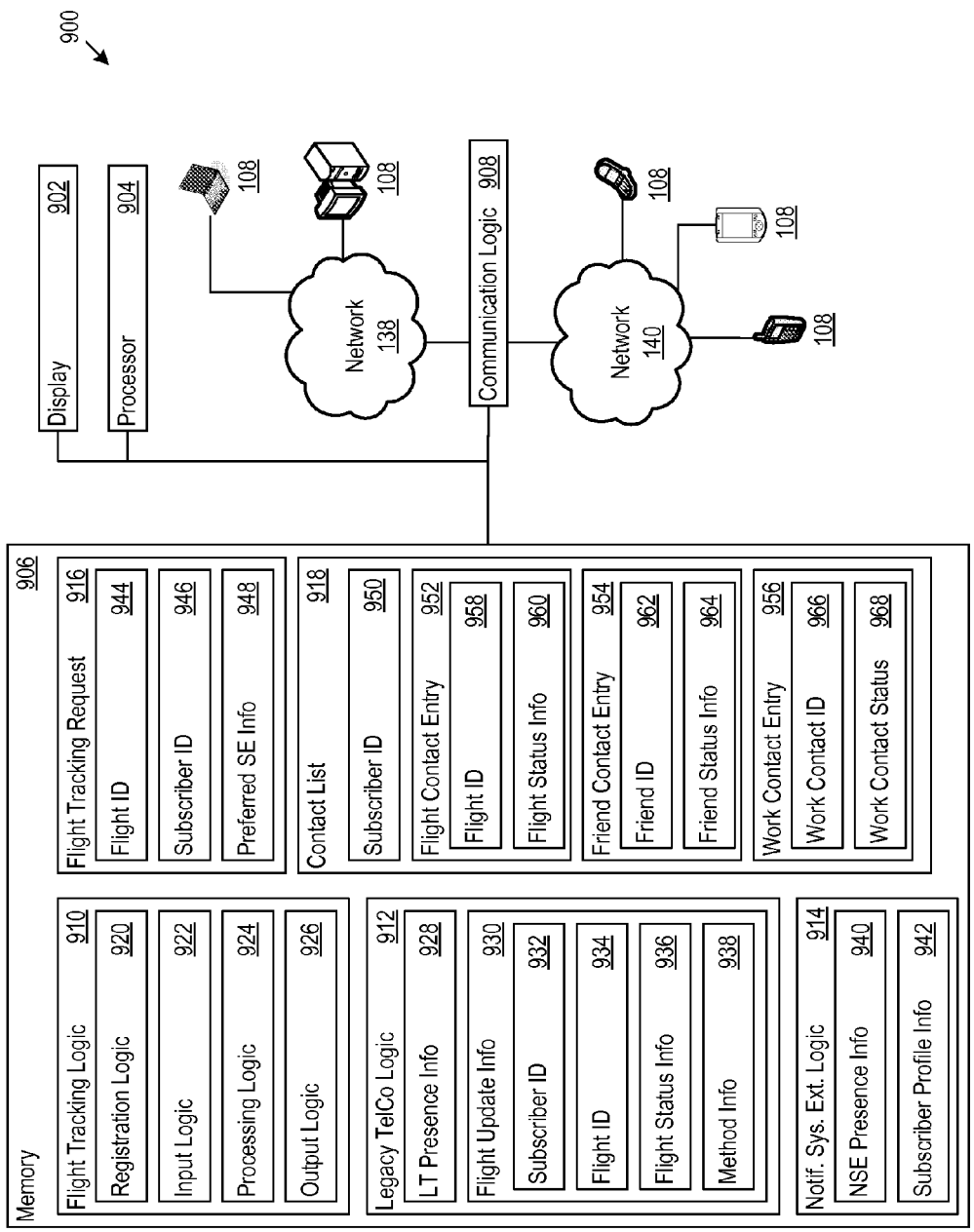
FIG. 9 shows an alternative cross-architecture flight tracking architecture.

FIG. 9 shows an alternative cross-architecture flight tracking architecture 900. In FIG. 9, the system architecture 900 includes a centralized implementation of the functionality noted above. In other words, the system need not be implemented with the distributed and delineated architecture shown in FIG. 1, but may be collapsed into fewer modules, systems, servers, or other realizations of the system. The architecture 900 includes a display 902, a processor 904, a memory 906, and communication logic 908. The communication logic 908 may interface messages among the display 902, the processor 904, the memory 906, and the networks 138 and 140. Each of the networks 138 and 140 may be in communication with subscriber endpoints 108 and/or with each other.

The memory 906 includes flight tracking logic 910, legacy telecommunications logic 912, notification system extension logic 914, a flight tracking request 916, and a contact list 918. The memory 906 may include one or multiple versions of these components. The flight tracking logic 910 may instruct the processor 904 to perform process flows for tracking of flight information. The LT logic 912 may instruct the processor 904 to perform process flows consistent with operations of the LTN 102. The NSE logic 914 may instruct the processor 904 to perform process flows consistent with operations of the NSE 104. The flight tracking request 916 stores information related to a flight tracking request. The contact list 918 stores data related to a subscriber's contact list. The contact list 918 may be consistent with a contact list stored in the GLMS 130.

The flight tracking logic 910 includes registration logic 920, input logic 922, processing logic 924, and output logic 926. The registration logic 920 may instruct the processor 904 to register a SE 108 with LT logic 912 and/or with NSE logic 914. In other words, the registration logic 920 may be similar, in particular substantially identical to or comprise/be comprised by legacy network presence register and/or the subscriber service. The input logic 922 may instruct the processor 904 to handle communications from a SE 108 or an airline to the architecture 900. In other words, the input logic 922 may be similar, in particular substantially identical to or comprise/be comprised by the gateway operable to accept a flight tracking request. The processing logic 924 may instruct the processor 904 to process communications among the LT logic 912, the NSE logic 914, a SE 108, and an airline. In other words, the processing logic 924 may be similar, in particular substantially identical to or comprise/be comprised by the legacy presence server. The output logic 926 may instruct the processor 904 to handle communications from the architecture 900 to a SE 108 or an airline. In other words, the output logic 926 may be similar, in particular substantially identical to or comprise/be comprised by the legacy presence server.

The LT logic 912 includes LT presence information 928 and flight update information 930. The LT presence information 928 may include presence information for a SE 108. For example, the LT presence information 928 may indicate that a SE 108 is available for communication through a legacy network architecture 140. The flight update information 930 may be used to internally update flight information within the architecture 900. Alternatively or additionally, the flight update information 930 may be used to notify a SE 108 for an updated flight status. The flight update information 930 may include a subscriber identifier 932, a flight identifier 934, a flight status 936, and/or a method of notification 938. The subscriber identifier 932 may be used to direct a notification message sent to a SE 108 or to identify a contact list 918 for updating. The flight ID 934 may be used to identify a flight contact entry for updating. Alternatively or additionally, the flight ID 934 may be used in a notification message sent to a SE 108 to identify the flight with the update. The flight status 936 may be stored with a contact list 918. Alternatively or additionally, the flight status 936 may be sent to a SE 108 to inform a subscriber of, e.g., a flight delay or cancellation. A notification method 938 may indicate whether an airline desires a subscriber to receive a notification through a change of contact status, an instant message, or through an SMS text.

The NSE logic 914 includes notification system extension presence information 940 and subscriber profile information 942. The NSE presence information 940 may include presence information for a SE 108. For example, the NSE presence information 940 may indicate that a SE 108 is available for communication through an IMS network 138. The subscriber profile information 942 may be used to establish proper communication channels. The subscriber profile information 942 may also contain filter criteria.

The flight tracking request 916 includes a flight identifier 944, a subscriber identifier 946, and preferred SE information 948. The flight identifier 944 may be used in the creation of a flight contact entry. The subscriber identifier 946 may be used in finding a contact list in which to enter a flight contact entry. The subscriber identifier 946 may also be used to identify the SE 108 to which a contact list update notification message may be sent. The preferred SE information 948 may be used to identify to which SE 108 associated with a subscriber any communications should be preferably directed. For example, a subscriber may use an instant message client running on a laptop, as well as a GSM phone. The subscriber may prefer notifications sent to the instant message client when the instant message client is available over text messages to the GSM phone. Alternatively or additionally, an airline may prefer that SMS-compatible clients be notified before IMS-enabled clients.

The contact list 918 includes a subscriber ID 950, a flight contact entry 952, a friend contact entry 954, and a work contact entry 956. The contact list may have one or multiple versions of these components. For example, a contact list 918 may have multiple subscriber IDs 950 corresponding to different platform-specific IDs, such as an AMERICA ONLINE™ INSTANT MESSENGER (AIM)™ ID, a YAHOO!™ MESSENGER™ ID, and a WINDOWS™ LIVE MESSENGER™ ID. Alternatively or additionally, a contact list 918 may have one or multiple flight contact entries 952, friend contact entries 954, and/or work contact entries 956.

The subscriber ID 950 may be used to identify the contact list 918. The flight contact entry 952 includes a flight ID 958 and flight status information 960. The flight ID 958 may be used to identify the flight contact entry 952. The flight status information 960 may be sent to interested parties, such as a SE 108, for display to the subscriber. The friend contact entry 954 includes a friend ID 962 and friend status information 964. The friend ID 962 may be used to identify the friend contact entry 954 and may correspond to a subscriber ID 950 of another contact list 918. The friend status information 964 may be sent to interested parties, such as a SE 108, for display to the subscriber. The work contact entry 956 includes a work contact ID 966 and work contact status information 968. The work contact ID 966 may be used to identify the work contact entry 952 and may correspond to a subscriber ID 950 of another contact list 918. The work contact status information 968 may be sent to interested parties, such as a SE 108, for display to the subscriber.

Figure 10:
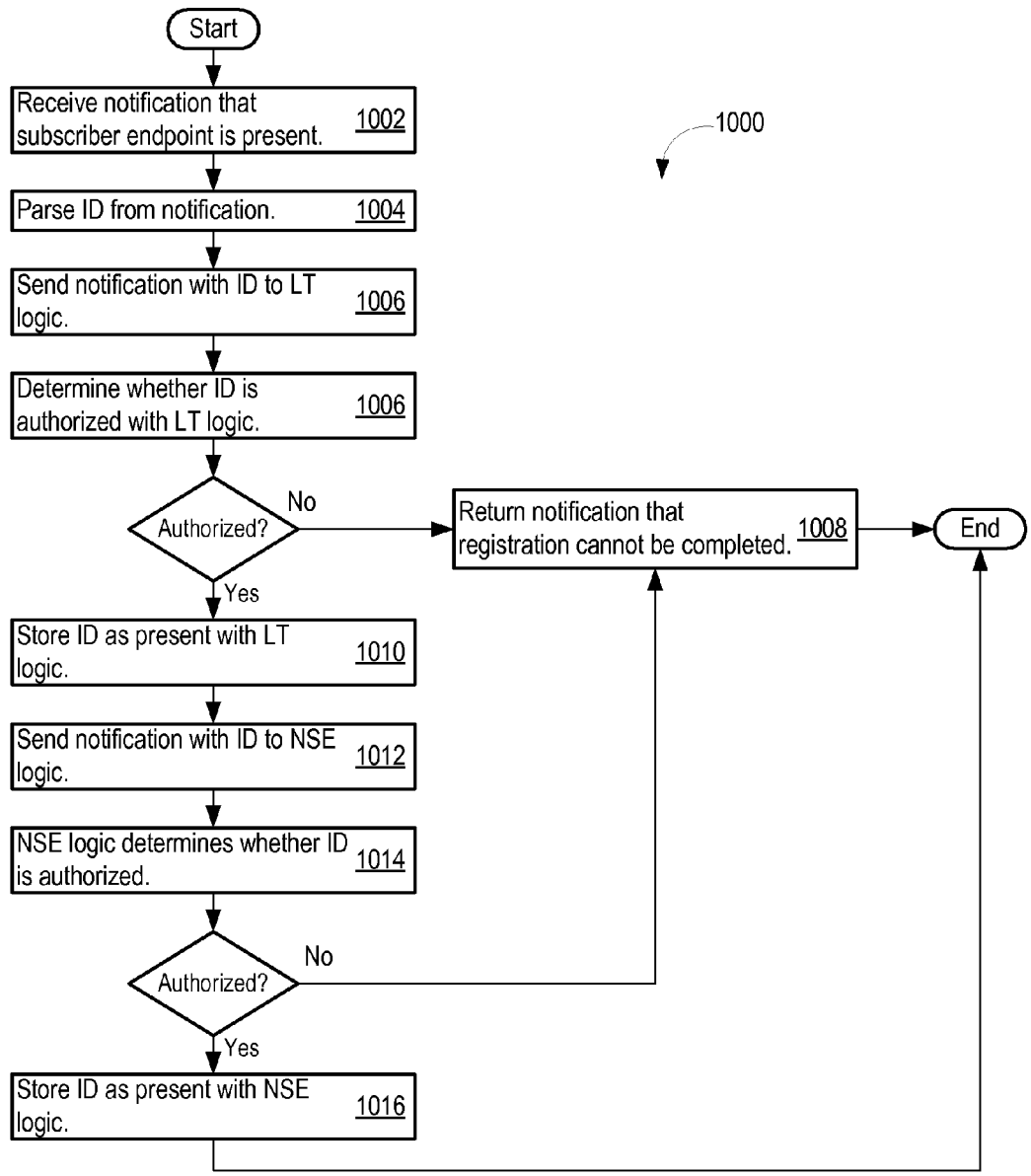
FIG. 10 shows a registration logic flow diagram.

FIG. 10 shows a flow diagram 1000 that may be performed by registration logic 920. Registration logic 920 receives notification that a SE 108 is present (1002). The notification may originate from the SE 108. Registration logic 920 parses identification information from the notification (1004). The ID information may include a subscriber identifier and/or a SE identifier. Registration logic 920 sends a notification along with the ID information to LT logic 912 (1006). This notification may be the notification originally received by the registration logic 920, or it may be a reformatted version of the original notification. Registration logic 920 determines whether the ID information is authorized with the LT logic 912 (1006). For example, the LT logic may compare the ID information against a list of authorized subscribers and send a confirmation signal to the registration logic 920.

If registration logic 920 determines the ID is not authorized, then the registration logic 920 returns to the requester a notification that the registration cannot be completed (1008). However, if registration logic 920 determines the ID is authorized, then the registration logic 920 stores the ID as present with the LT logic 912 (1010). For example, registration logic 920 may request the LT logic 912 store the ID as LT presence information 928. Registration logic 920 optionally sends a notification along with the ID information to NSE logic 914 (1012). This notification may be the notification sent to the LT logic 912, or it may be a reformatted version of that notification. Registration logic 920 requests the NSE logic 914 to determine whether the ID information is authorized (1014). For example, the NSE logic 914 may compare the ID information with a list of authorized subscribers, such as a collection of subscriber profile information 942, and return a confirmation signal to the registration logic 920.

If registration logic 920 determines the ID is not authorized, then the registration logic 920 returns to the requester a notification that the registration cannot be completed (1008). However, if registration logic 920 determines the ID is authorized, then the registration logic 920 requests the NSE logic 914 to store the ID as present. For example, the NSE logic 914 may store the ID information as NSE presence information 940.

Figure 11:
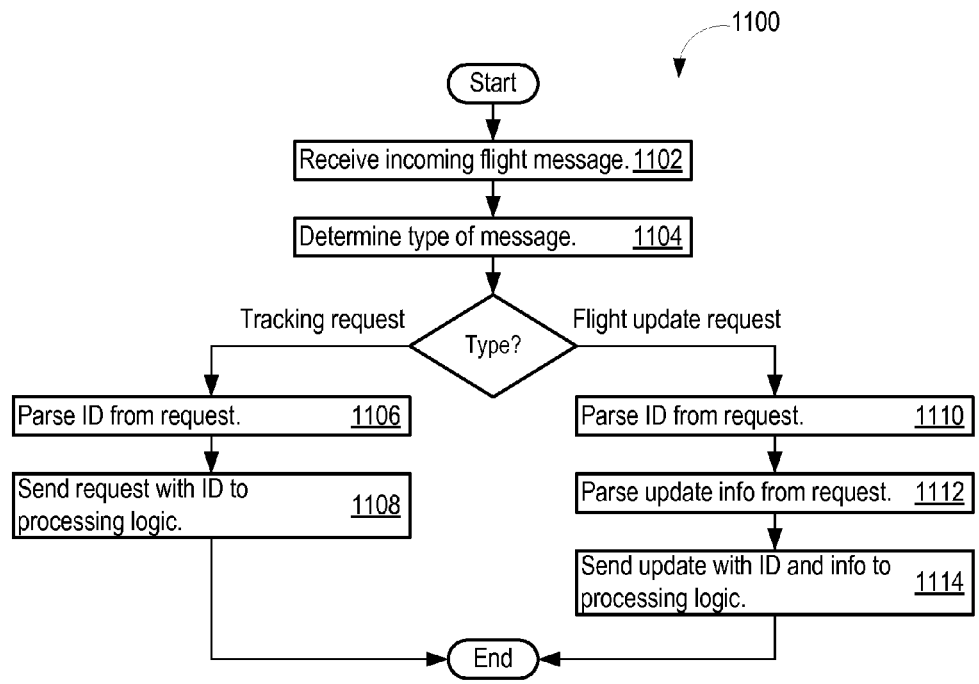
FIG. 11 shows an input logic flow diagram.

FIG. 11 shows a flow diagram 1100 that may be performed by input logic 922. Input logic 922 receives an incoming flight message (1102). The incoming flight message may originate from an airline. The message may be in response to a flight tracking request, a flight status update, or another event. Input logic 922 determines the type of message (1104). Input logic 922 may make this determination by reading type information sent as part of the message. Alternatively or additionally, input logic 922 may make the determination based on the information content sent along with the message.

If input logic 922 determines that the message is a flight tracking request, input logic 922 parses ID information from the request (1106). The ID information may include a subscriber identifier, a SE identifier, and/or a flight identifier. Input logic 922 may optionally parse additional information from the message, such as initial flight status information. Input logic 922 then sends the parsed information to processing logic 924 (1108). The parsed information may include the ID information and/or any additional information from the request.

If input logic 922 determines that the message is a flight update request, input logic 922 parses ID information from the request (1110). The ID information may include a subscriber identifier, a SE identifier, and/or a flight identifier. Input logic 922 also parses update information from the message, such as updated flight status information (1112). Input logic 922 then sends the parsed information to processing logic 924 (1114). The parsed information may include the ID information, the updated information, and/or any additional information from the request.

Figure 12:
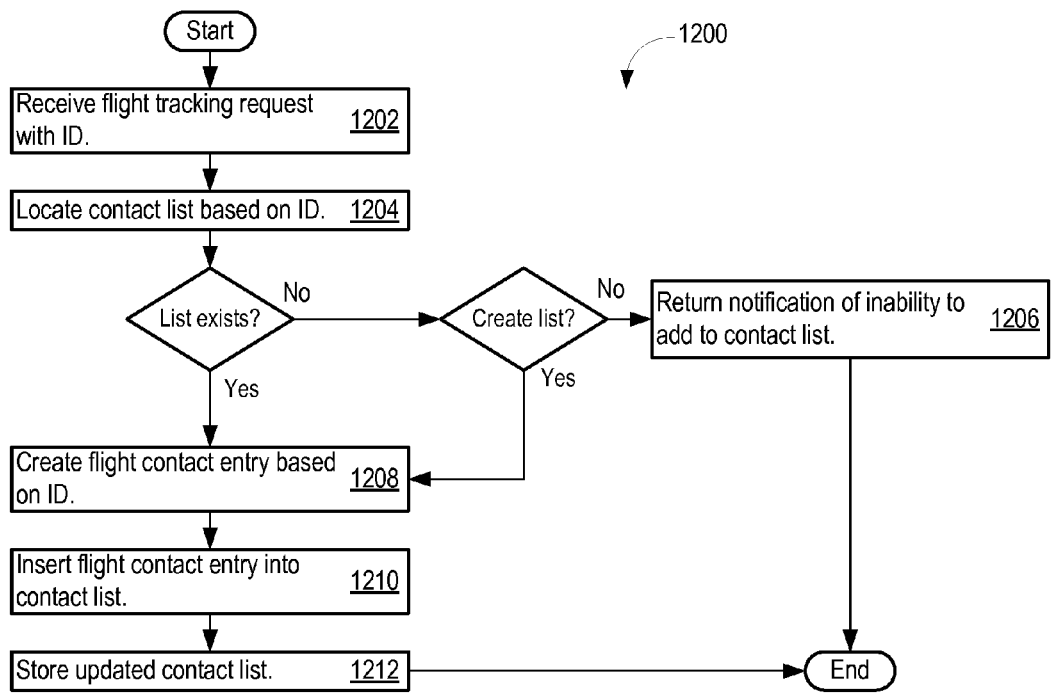
FIG. 12 shows a processing logic flow diagram for flight object creation.

FIG. 12 shows a flow diagram 1200 for flight object creation that may be performed by processing logic 924. Processing logic 924 receives a flight tracking request (1202). The request may originate from input logic 922. Alternatively or additionally, the request may originate from the TPG 110, communication logic 908, or from an airline. The request may include identification information, such as a subscriber identifier, a SE identifier, and/or a flight identifier. The request may include additional information, such as initial flight status information.

Processing logic 924 attempts to locate a contact list 918 (1204). Processing logic 924 may use the identification information to locate the contact list 918. For example, processing logic 924 may compare a subscriber identifier from the identification information against subscriber identifiers 950 from contact lists 918. If a contact list cannot be located, processing logic 924 may attempt to create a contact list. If processing logic 924 determines that a list will not be created, processing logic 924 returns to the requester a notification that the flight tracking request cannot be added to the contact list 918 (1206).

If a list does exist, processing logic 924 creates a flight contact object entry 952 (1208). Hence, the processing logic may be similar, in particular substantially identical to or comprise/be comprised by the orchestration module. The flight contact object entry may have a format similar to a friend contact entry 954 and/or a work contact entry 956. For example, processing logic 924 may store the flight identifier from the request as a flight identifier 958 in the flight contact entry 952. Alternatively or additionally, processing logic 924 may store the initial flight status information from the request as flight status info 960 in the flight contact entry 952.

Processing logic 924 then inserts the flight contact entry 952 into the contact list 918 (1210). Processing logic 924 may insert the flight contact entry 952 into the contact list 918 with a subscriber identifier 950 corresponding with the subscriber identifier from the request. Processing logic 924 stores the contact list with the new flight contact entry 952 (1212). If no contact list exists and processing logic 924 determines that a list should be created, then processing logic 924 may create a contact list 918 using the subscriber identifier from the request before creating a flight contact entry.

Figure 13:
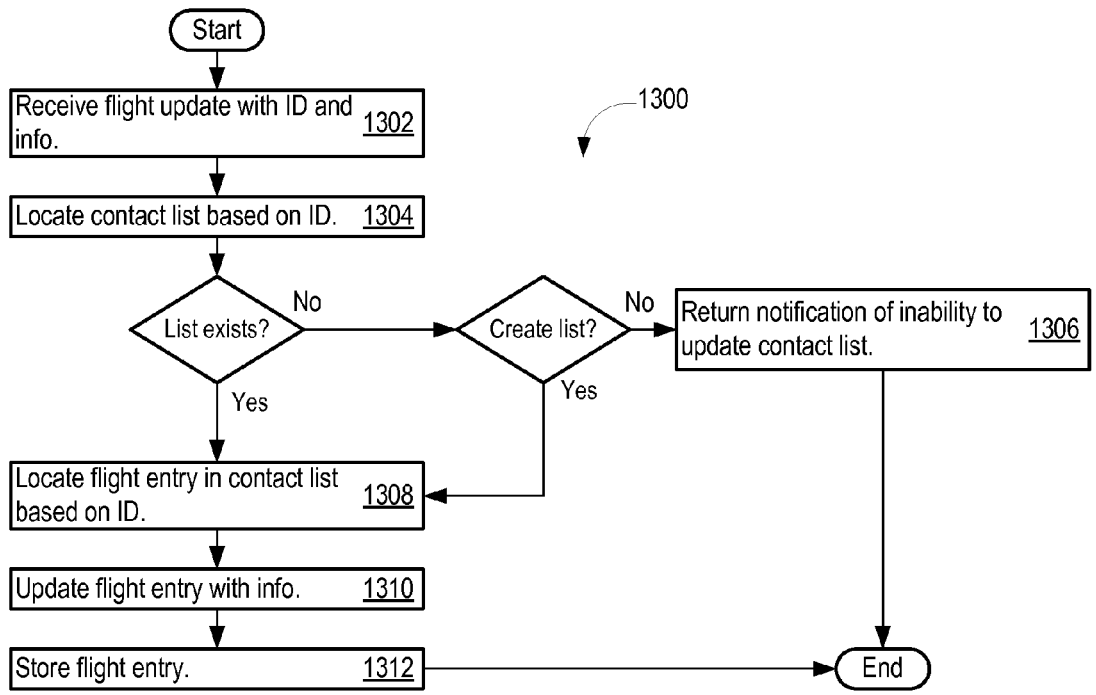
FIG. 13 shows a processing logic flow diagram for flight status updating.

FIG. 13 shows a flow diagram 1300 for flight status updating that may be performed by processing logic 924. Processing logic 924 receives a flight status update (1302). The flight status update may originate from input logic 922. Alternatively or additionally, the request may originate from the TPG 110, communication logic 908, or from an airline. The request may include identification information, such as a subscriber identifier, a SE identifier, and/or a flight identifier. The request may include additional information, such as updated flight status information.

Processing logic 924 attempts to locate a contact list 918 (1304). Processing logic 924 may use the identification information to locate the contact list 918. For example, processing logic 924 may compare a subscriber identifier from the identification information against subscriber identifiers 950 from contact lists 918. If a contact list cannot be located, processing logic 924 may attempt to create a contact list. If processing logic 924 determines that a list will not be created, processing logic 924 returns to the requester a notification that the flight status update request cannot be performed (1306).

If a list does exist, processing logic 924 locates a flight contact object entry 952 within the contact list 918 (1308). Processing logic 924 may use the identification information to locate the flight contact object entry 952. For example, processing logic 924 may compare a flight identifier from the identification information against flight identifiers 950 from the contact list 918. If a flight contact entry 952 cannot be located, processing logic 924 may attempt to create a flight contact entry 952. If processing logic 924 determines that a flight contact entry will not be created, processing logic 924 returns to the requester a notification that the flight status update request cannot be performed (1306).

Processing logic 924 updates the flight contact entry with information from the request (1310). For example, processing logic 924 may store the updated flight status information from the request as flight status information 960 within the flight contact entry 952. Processing logic 924 stores the flight contact object entry (1312).

Figure 14:
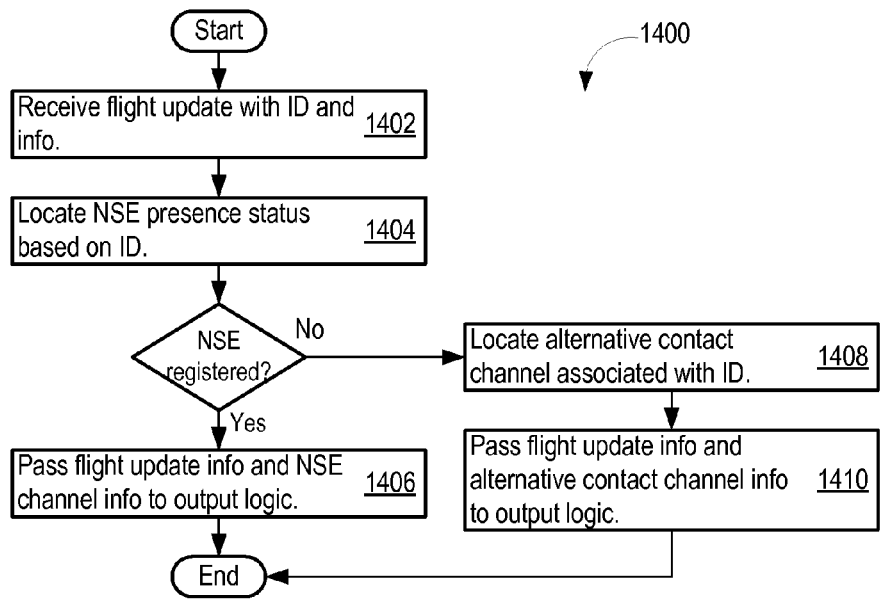
FIG. 14 shows a processing logic flow diagram for flight status update notification.

FIG. 14 shows a flow diagram 1400 for flight status update notification that may be performed by processing logic 924. Processing logic 924 receives a flight status update (1402). The flight status update may originate from input logic 922. Alternatively or additionally, the request may originate from the TPG 110, communication logic 908, or from an airline. The request may include identification information, such as a subscriber identifier, a SE identifier, and/or a flight identifier. The request may include additional information, such as updated flight status information.

Processing logic 924 attempts to locate a NSE presence status based on the identification information (1404). Processing logic 924 may use the identification information to locate the NSE presence status. For example, processing logic 924 may compare a SE identifier from the identification information against SE identifiers stored in NSE presence information 940. If processing logic 924 locates corresponding identification information indicating a SE is registered and present through NSE communication channels, processing logic 924 passes updated flight status information and NSE communication channel information to output logic 926 (1406).

If processing logic 924 determines that a SE is not available through NSE communication channels, processing logic 924 locates an alternative contact channel associated with the identification information (1408). For example, processing logic 924 may inquire with LT logic 912 to determine whether the identification information corresponds to SE identification information in the LT presence information 928. If so, then processing logic 924 may use a LT communication channel to contact the SE. Processing logic 924 passes the flight status update information and the alternative contact channel information to output logic 926 (1410).

Figure 15:
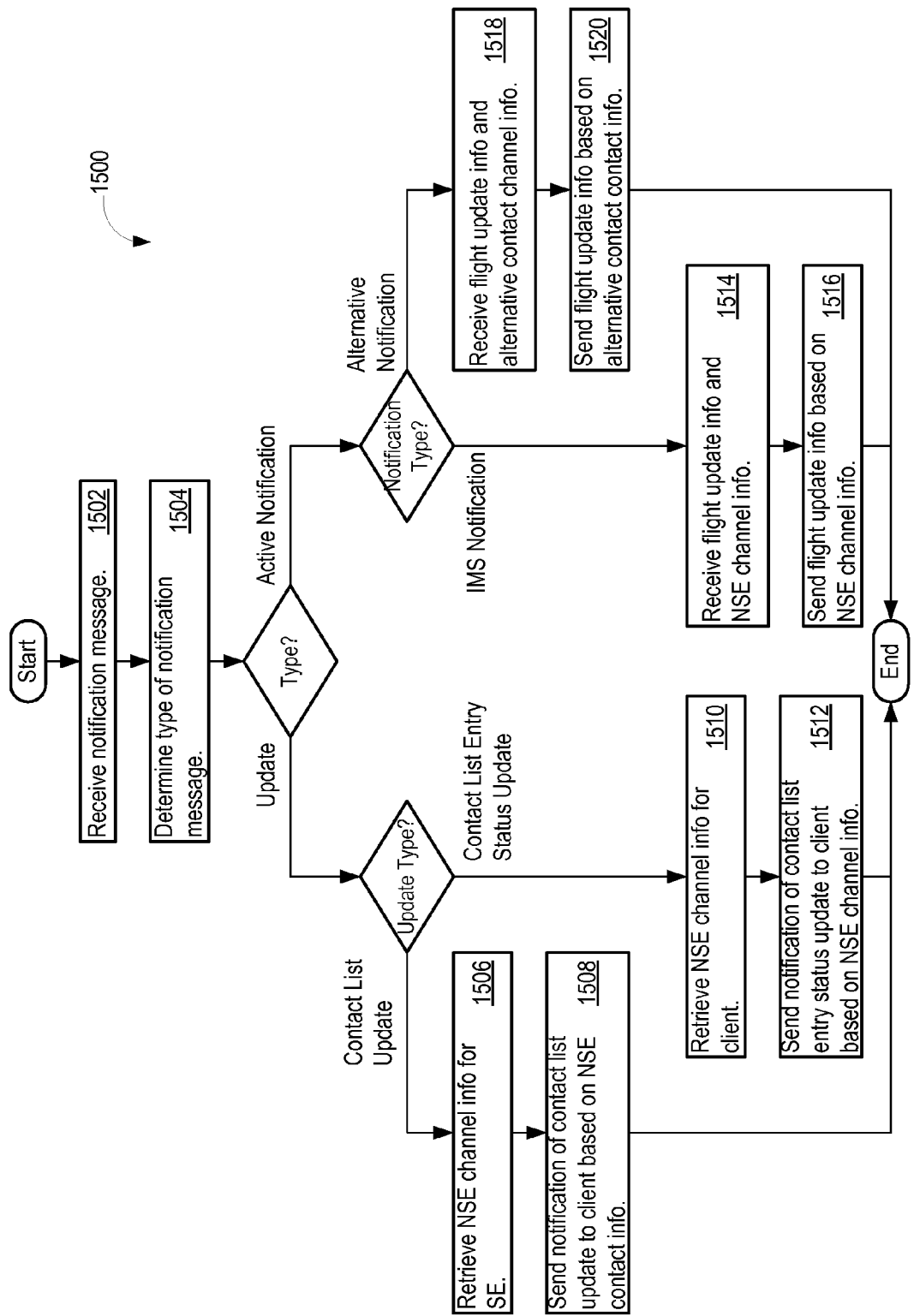
FIG. 15 shows an output logic flow diagram.

FIG. 15 shows a flow diagram 1500 that may be performed by output logic 926. Output logic 926 receives a notification message (1502). The notification message may originate from processing logic 924. Alternatively or additionally, the message may originate from input logic 922, communication logic 908, or from an airline. The message may include identification information, such as a subscriber identifier, a SE identifier, and/or a flight identifier. The request may include additional information, such as initial flight status information, updated flight status information, notification that an updated contact list is available, and/or communication channel information.

Output logic 926 determines the type of notification message (1504). This determination may include checking a type field within the message. Alternatively or additionally, the determination may include checking other information or information fields within the message.

If output logic 926 determines the message is an update message and the update is for a contact list, output logic 926 retrieve NSE contact information associated with a SE 108 (1506). For example, output logic 926 may request the NSE logic 914 to retrieve information from the NSE presence info 940 or the subscriber profile info 942. Output logic 926 may then send a notification message to the SE 108 indicating that an updated contact list is available (1508). This notification message may be routed through an IMS-enabled network 138.

If output logic 926 determines the message is an update message and the update is for a status update, output logic 926 retrieves NSE channel information associated with a SE 108 (1510). For example, output logic 926 may request the NSE logic 914 to retrieve information from the NSE presence info 940 or the subscriber profile info 942. Output logic 926 may then send a status update message to the SE 108 indicating a change in the status of a contact list entry (1512). This notification message may be routed through an IMS-enabled network 138.

If output logic 926 determines the message is an active notification message and the notification should be through an IMS-enabled channel, output logic 926 receives the flight status update information (1514). The notification message may originate from processing logic 924. Alternatively or additionally, the message may originate from input logic 922, communication logic 908, or from an airline. The message may include identification information, such as a subscriber identifier, a SE identifier, and/or a flight identifier. The request may include additional information, such as updated flight status information and/or communication channel information.

Output logic 926 sends the updated flight status information to a SE 108 based on the communication channel information (1516). For example, output logic 926 may request the NSE logic 914 to retrieve information from the NSE presence info 940 or the subscriber profile info 942 corresponding to the channel information. The notification message may be routed through an IMS-enabled network 138.

If output logic 926 determines the message is an active notification message and the notification should be through an alternative communication channel, output logic 926 receives the flight status update information (1518). The notification message may originate from processing logic 924. Alternatively or additionally, the message may originate from input logic 922, communication logic 908, or from an airline. The message may include identification information, such as a subscriber identifier, a SE identifier, and/or a flight identifier. The request may include additional information, such as updated flight status information and/or communication channel information.

Output logic 926 sends the updated flight status information to a SE 108 based on the communication channel information (1520). For example, output logic 926 may request the LT logic 912 to retrieve information from the LT presence info 928 corresponding to the channel information. The notification message may be routed through an legacy network architecture 140.

Figure 16:
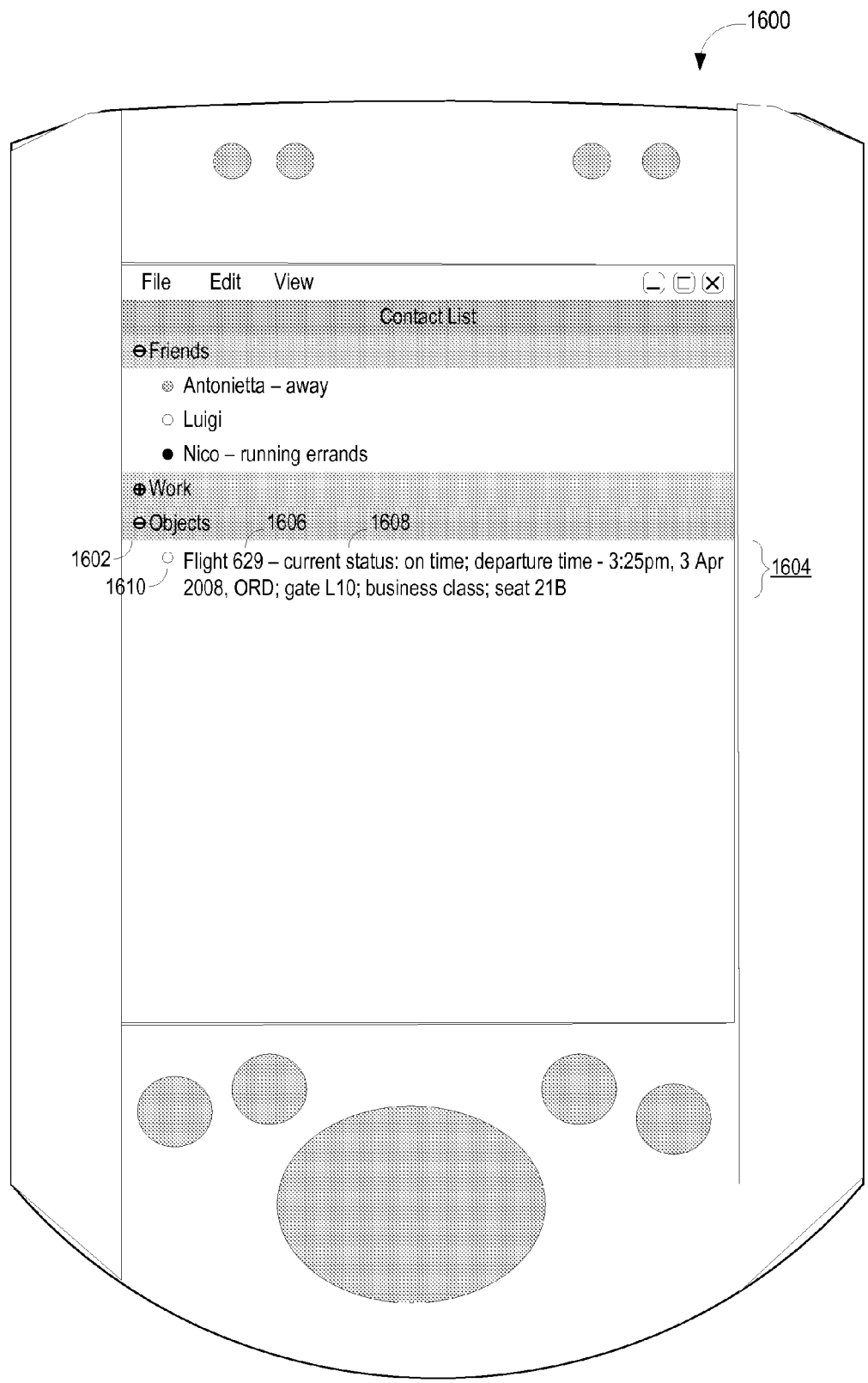
FIG. 16 shows a subscriber endpoint contact list rendering with a flight object.

FIG. 16 shows a subscriber endpoint contact list rendering 1600 with a flight object. The rendering 1600 includes an objects section 1602. The objects section 1602 includes a flight object rendering 1604. Alternatively or additionally, the flight object rendering 1604 may be under a section with a different section identifier. Alternatively or additionally, the flight object rendering 1604 may be under a "Friends" or any other display section.

The flight object rendering 1604 displays information associated with a flight object. For example, the flight object rendering 1604 includes a flight identifier rendering 1606, a status text rendering 1608, and a status indicator rendering 1610. The flight object rendering 1604 may include more or less components.

The flight identifier rendering 1606 indicates a flight identifier associated with the flight object rendering 1604. For example, the flight identifier rendering 1606 indicates that the flight object rendering 1604 corresponds to flight number 629. Alternatively or additionally, the flight object rendering 1604 may indicate an airline name or other flight indication information.

The status text rendering 1608 indicates status information associated with the flight identifier rendered in the flight identifier rendering 1606. For example, status text rendering 1608 indicates that flight 629 is currently running on time, that its departure time is 3:25 pm on 3 Apr. 2008, that the flight is out of O'Hare, gate L10, and that the ticket for business class, seat 21 B has been allocated to the subscriber. Alternatively or additionally, other flight status information may be rendered, such as other current status information, other departure times and dates, other airport or terminal information, or other class or seat information. Alternatively or additionally, the status text rendering 1608 may include an estimated arrival time, arrival airport or terminal information, and/or connecting flight information.

The status indicator rendering 1610 indicates a status of the flight object 1604. For example, status indicator rendering 1610 is currently a white bubble and may indicate no problems with the current flight. Alternatively or additionally, the status indicator rendering 1610 may include other shapes, colors, or forms for indicative purposes. The status indicator rendering 1610 may provide alternative or additional indications. For example, the status indicator rendering 1610 may indicate a delay, a cancellation, and/or a gate change.

Figure 17:
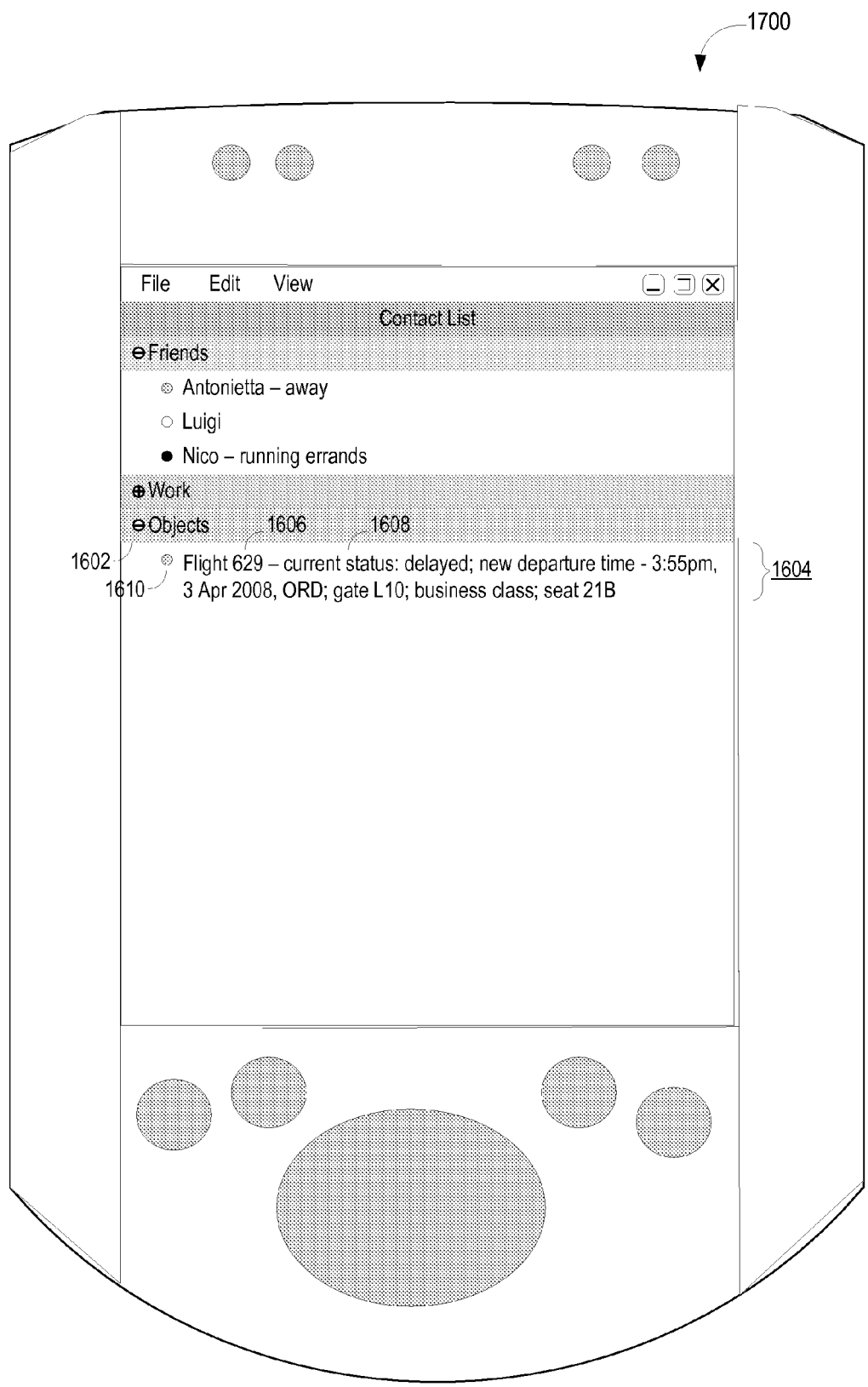
FIG. 17 shows a subscriber endpoint contact list rendering with a flight status update.

FIG. 17 shows a subscriber endpoint contact list rendering 1700 with a flight status update. The rendering 1700 shows one example of the rendering 1600 after the SE 108 receives a flight status update message. For example, status text rendering 1608 now indicates that flight 629 is delayed, and the new departure time is 3:55 pm. Additionally, the status indicator rendering 1610 is now a grey bubble and may indicate that the flight is delayed.

Figure 18:
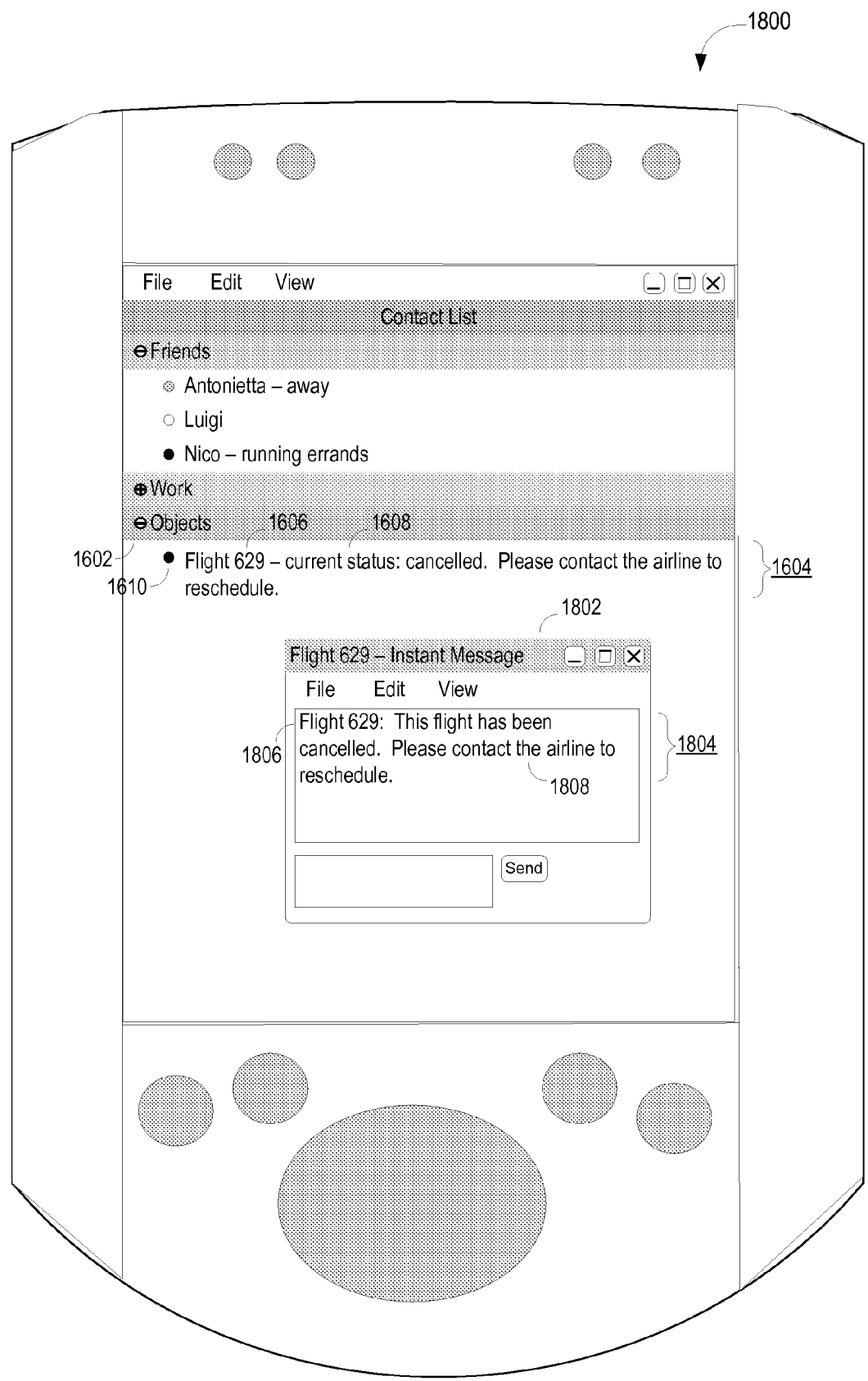
FIG. 18 shows a subscriber endpoint contact list rendering with a flight status notification.

FIG. 18 shows a subscriber endpoint contact list rendering 1800 with a flight status notification. The rendering 1800 shows one example of the rendering 1600 after the SE 108 receives a flight status notification. For example, the rendering 1800 includes an instant messaging window 1802. The instant messaging window 1802 may provide an active notification of flight status update information. For example, the instant messaging window 1802 includes an instant message 1804.

The instant message 1804 may convey the flight status update information to the subscriber. The instant message 1804 includes a flight identifier rendering 1806 and an instant message text 1808. The flight identifier rendering 1806 may indicate the flight associated with the flight status update information. The flight identifier rendering 1806 may include the same information as the flight identifier rendering 1606. The instant message text 1808 may include flight status update information. The instant message text 1808 may include the same or similar information as status text rendering 1608. The instant message text 1808 may include additional information, such as instructions. For example, the instant message text 1808 includes both status information indicating the flight has been cancelled and instructions indicating that the subscriber should contact the airline to reschedule.

Figure 19:
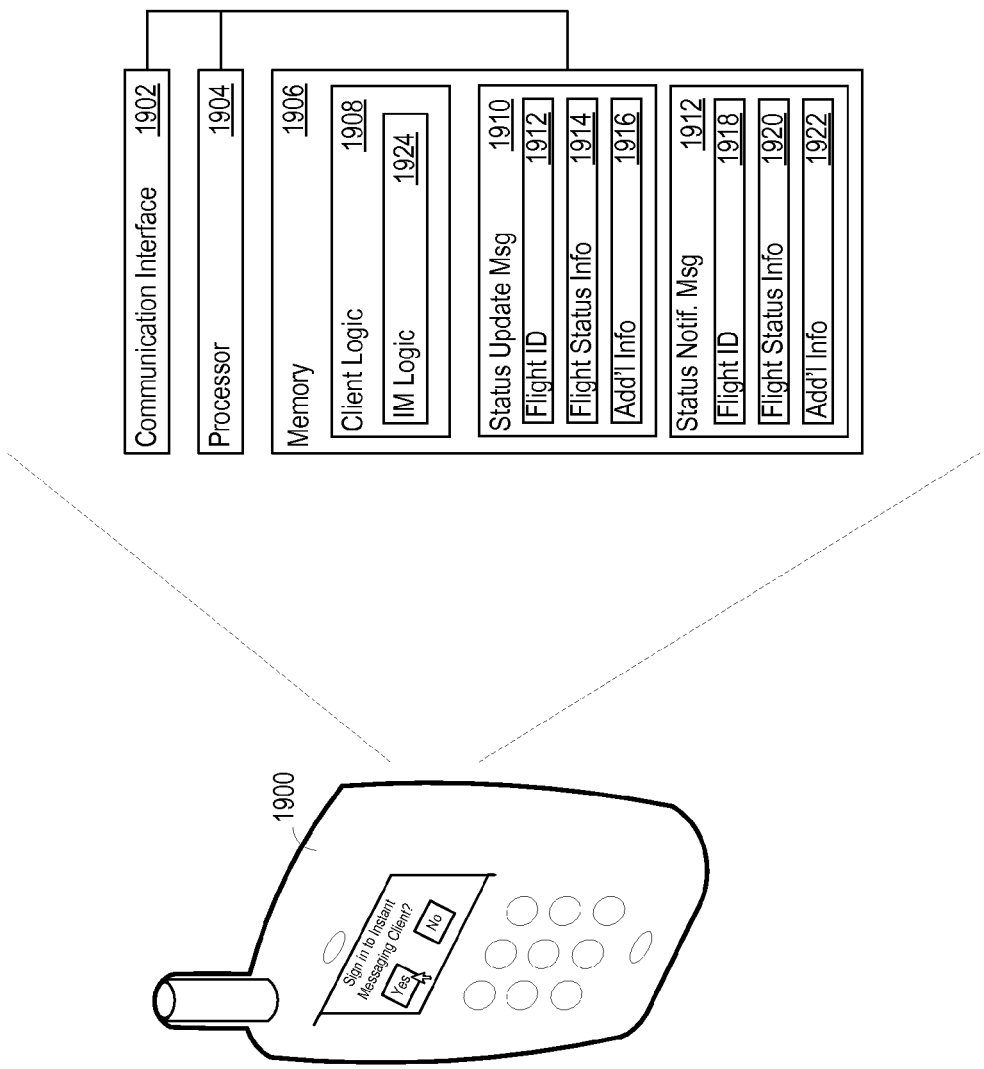
FIG. 19 shows a subscriber endpoint with client logic.

FIG. 19 shows an example of a subscriber endpoint 1900 that supports status update messaging and status update notification processing in an instant messaging application. The subscriber endpoint 1900 includes a communication interface 1002 (e.g., an antenna, amplifier, filter, demodulator, or other signal processing logic), a processor 1904, and a memory 1906. The communication interface 1902 may be a wired or wireless interface, and the transmitted signals may adhere to a diverse array of formats, modulations, frequency channels, bit rates, and encodings, such as those specified by WiFi, Bluetooth, Global System for Mobile communications (GSM), Time Division Multiple Access (TDMA), Frequency Division Multiple Access (FDMA), Evolution-Data Optimized (EVDO), Code Division Multiple Access (CDMA), 3rd Generation Partnership Project (3GPP or 3GPP2), or other wireless or wired protocols.

The processor 1904 executes the client logic 1908 to carry out the status update messaging and status update notification processing explained above. FIG. 19 shows that the memory 1906 provides storage for a flight status update message 1910 and a flight status notification message 1912. The flight status update message 1910 and/or the flight status notification message 1912 may be received over the communication interface 1902.

The flight status update message 1910 includes a flight identifier 1912, flight status information 1914, and additional information 1916. The flight identifier 1912 may serve to identify the object for which the status will be updated. The flight status info 1914 may include an indication that the flight is on time, delayed, or cancelled. The flight status info 1914 may be a text field or a code associated with predetermined statuses. The additional info 1916 may be information either the airline may wish to communicate to the subscriber or that the subscriber may wish to receive from the airline. The additional info 1916 may include departure and/or arrival times and/or dates, airport and/or terminal information, gate information, and/or class and/or seat information.

The flight status notification message 1912 includes a flight identifier 1918, flight status information 1920, and additional information 1922. The flight identifier 1918 may serve to identify the object for which the status will be updated. The flight status info 1920 may include an indication that the flight is on time, delayed, or cancelled. The flight status info 1920 may be a text field or a code associated with predetermined statuses. The additional info 1922 may be information either the airline may wish to communicate to the subscriber or that the subscriber may wish to receive from the airline. The additional info 1922 may include departure and/or arrival times and/or dates, airport and/or terminal information, gate information, class and/or seat information, and/or instructions from the airline.

The client logic 1908 includes an instant messaging logic 1924. The instant messaging logic 1924 may include receiving logic for receiving the status update message 1910 and/or the status notification message 1912. The instant messaging logic 1924 may further include rendering logic for rendering a display. The rendering logic may render parts or all of the status update message 1910 and/or the status notification message 1912. For example, the rendering logic may render the displays as shown in FIGS. 16, 17, and/or 18.

Figure 20:
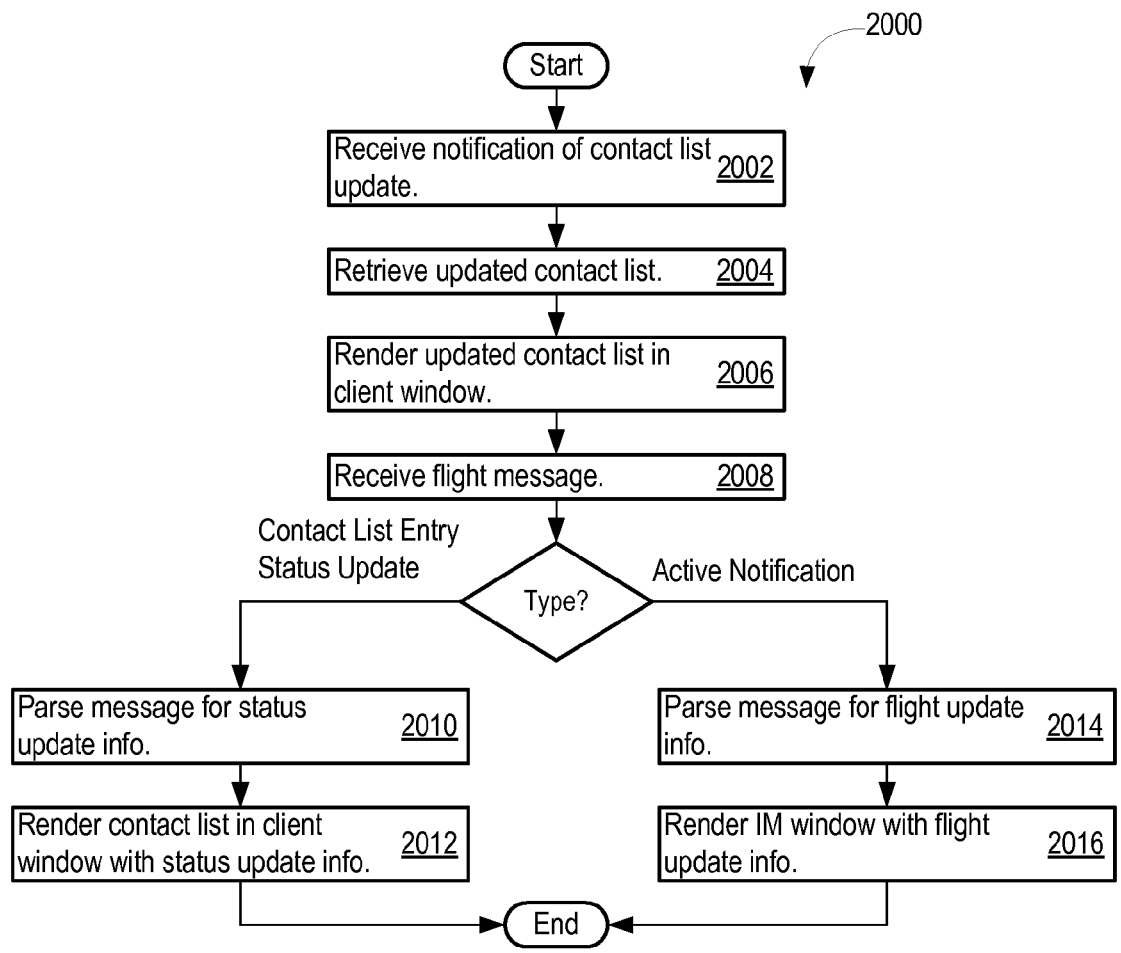
FIG. 20 shows a client logic flow diagram.

FIG. 20 shows a flow diagram 2000 that may be performed by client logic 1908. The client logic 1908 receives notification of a contact list update (2002). The notification may be received from a communication interface 1902 in communication with, e.g., a NSE network 138. The client logic 1908 retrieves an update contact list (2004). The updated contact list may be retrieved through the communication interface 1902 in communication with, e.g. a NSE network 138. The client logic 1908 renders the updated contact list in the client window (2006). The updated contact list may appear similar to rendering 1600.

The client logic 1908 receives a flight message (2008). The flight message may be received from the communication interface 1902. The flight status update message may include a flight identifier, flight status information, and/or additional information.

If the client logic 1908 determines that the flight message is a contact list entry status update message, then the client logic 1908 parses the flight status update message for status update information (2010). The status update information may include an indicator that the flight is on-time, delayed, cancelled, or any other flight status. The status update information may include any additional information, such as departure or arrival times, gate information, airport or terminal information, class or seat information, or airline instructions. The client logic 1908 renders the contact list in the client window to reflect the status update information (2012). The rendering may appear similar to rendering 1700.

If the client logic 1908 determines that the flight message is an active notification, then the client logic 1908 parses the flight status notification message for flight status update information (2014). The flight status update information may include an indicator that the flight is on-time, delayed, cancelled, or any other flight status. The status update information may include any additional information, such as departure or arrival times, gate information, airport or terminal information, class or seat information, or airline instructions. The client logic 1908 renders the client window to reflect the status update information (2016). The rendering may include a pop-up window including the status update information. The rendering may appear similar to rendering 1800.

The systems may be implemented in many different ways. For example, although some features are shown stored in computer-readable memories (e.g., as logic implemented as computer-executable instructions or as data structures in memory), all or part of the systems, logic, and data structures may be stored on, distributed across, or read from other machine-readable media. The media may include hard disks, floppy disks, CD-ROMs, a signal, such as a signal received from a network or partitioned into sections and received in multiple packets communicated across a network. The systems may be implemented in software, hardware, or a combined form of software and hardware.

Furthermore, the systems may be implemented with additional, different, or fewer components. As one example, a processor or any other logic may be implemented with a microprocessor, a microcontroller, a DSP, an application specific integrated circuit (ASIC), program instructions, discrete analog or digital logic, or a combination of other types of circuits or logic. As another example, memories may be DRAM, SRAM, Flash or any other type of memory. The systems may be distributed among multiple components, such as among multiple processors and memories, optionally including multiple distributed processing systems. Logic, such as programs or circuitry, may be combined or split among multiple programs, distributed across several memories and processors, and may be implemented in or as a function library, such as a dynamic link library (DLL) or other shared library.

While various embodiments of the cross-architecture flight tracking system have been described, it will be apparent to those of ordinary skill in the art that many more embodiments and implementations are possible within the scope of the invention. Accordingly, the invention is not to be restricted except in light of the attached claims and their equivalents.

In other implementations, the system may track events other than airline flights using contact list objects. Examples of other events include news updates; investment quotes, such as stock, mutual fund, or bond quotes; online auction status; restaurant wait time updates; vehicle repair status, e.g., to track when a repair shop is finished fixing a car; store sales alerts, e.g., to track when an item goes on sale; and other events. As one specific example for news updates, the subscriber may request a subscription for a news service to communicate a news story to the LTN 102. The LTN 102 may add the news event as an object in the subscriber's contact list, receive news updates from the news service in the same way the LTN 102 receives flight updates from an airline, and communicate the news updates to the subscriber using either the legacy network infrastructure 140 or the NSE 104. Similar event tracking may occur with respect to the other examples given above, or an other event, by receiving an event subscription, creating a corresponding event object entry in a contact list, sending the updated contact list to a subscriber, receiving event updates, and communicating the event updates to the subscriber via either a legacy network infrastructure or a network system extension.

As a summary, one implementation may relate to a flight tracking method comprising: registering a subscriber endpoint as present with a legacy telecommunication network; registering the subscriber endpoint as present with a notification system extension to the legacy telecommunication network; accepting a flight tracking request comprising a flight identifier; inserting a flight contact entry linked to the flight identifier into an existing contact list for the subscriber endpoint to obtain an updated contact list; notifying the subscriber endpoint through the notification system extension of the updated contact list including the flight contact entry; receiving an airline service flight update at the legacy telecommunication network; maintaining a flight status responsive to the airline service flight update; and communicating the flight status to the subscriber endpoint in a flight contact object status message for the existing contact list.

The method may further comprise: communicating a flight contact object notification message regarding the flight status to the subscriber endpoint. The method may further comprise: determining a communication channel for communicating the flight contact object notification message to the subscriber endpoint. The method may further comprise: sending the flight contact object notification message to the subscriber endpoint through the communication channel. The method may further comprise: choosing a message service communication channel supporting the subscriber endpoint through the notification system extension to the legacy telecommunication network. The message service communication channel may comprise an Instant Message communication channel. The method may further comprise: choosing a message service communication channel supporting the subscriber endpoint through the legacy telecommunication network. The message service communication channel may comprise a Short Message Service communication channel.

Another implementation may relate to a flight tracking system comprising: a notification system extension to a legacy telecommunication network comprising: a subscriber service operable to register a subscriber endpoint as present with the notification system extension; the legacy telecommunication network comprising: a legacy network presence register operable to register the subscriber endpoint as present with the legacy telecommunication network; a gateway operable to accept a flight tracking request from the subscriber endpoint, the flight tracking request comprising a flight identifier, and an airline flight status update; an orchestration module operable to: insert a flight contact entry linked to the flight identifier into an existing contact list for the subscriber endpoint to obtain an updated contact list; and maintain a flight status responsive to the airline service flight update; a legacy presence server operable to: initiate notification to the subscriber endpoint of the updated contact list including the flight contact entry; and initiate communication of the flight status to the subscriber endpoint in a flight contact object status message for the existing contact list.

The legacy presence server may further be operable to initiate communication of a flight contact object notification message regarding the flight status to the subscriber endpoint. The legacy presence server may further be operable to determine a communication channel for communicating the flight contact object notification message to the subscriber endpoint. The legacy presence server may further be operable to send the flight contact object notification message to the subscriber endpoint through the communication channel. The legacy presence server may further be operable to determine the communication channel by: choosing a message service communication channel supporting the subscriber endpoint through the notification system extension to the legacy telecommunication network. The legacy presence server may further be operable to choose a message service communication channel comprising an Instant Message (IM) communication channel. The legacy presence server may further be operable to determine the communication channel by: choosing a message service communication channel supporting the subscriber endpoint through the legacy telecommunication network. The legacy presence server may further be operable to choose a message service communication channel comprising a Short Message Service (SMS) communication channel.

Another implementation may relate to a product, in particular to a computer program product stored on a computer readable memory and/or provided as a signal and/or as a data stream, which when loaded in the memory of a computer and executed by the computer urges the computer to carry out a method as described above. The product may comprise and/or access a memory, where registration logic which may be stored in the memory and/or be provided as a signal and/or as a data stream is operable to: register a subscriber endpoint as present with a legacy telecommunication network; and register the subscriber endpoint as present with a notification system extension to the legacy telecommunication network; input logic which may be stored in the memory and/or be provided as a signal and/or as a data stream is operable to: accept a flight tracking request comprising a flight identifier; and receive an airline service flight update at the legacy telecommunication network; processing logic which may be stored in the memory and/or be provided as a signal and/or as a data stream is operable to: insert a flight contact entry linked to the flight identifier into an existing contact list for the subscriber endpoint to obtain an updated contact list; and maintain a flight status responsive to the airline service flight update; and output logic which may be stored in the memory and/or be provided as a signal and/or as a data stream is operable to: notify the subscriber endpoint through the notification system extension of the updated contact list including a flight contact entry; and communicate the flight status to the subscriber endpoint in a flight contact object status message for the existing contact list.

The output logic may further be operable to communicate a flight contact object notification message regarding the flight status to the subscriber endpoint. The processing logic may further be operable to determine a communication channel for communicating the flight contact object notification message to the subscriber endpoint. The output logic may further be operable to send the flight contact object notification message to the subscriber endpoint through the communication channel.

Other implementations allow an improved data provision through a computer system to a user of the computer system, in particular of one or more elements of the computer system. The user may handle a component of the computer system, such as a mobile device. The computer system may provide the user with data through said mobile device. Data provision may be fully automatic or semi automatic. Advantageously, the user may be provided with data, in particular an update of data, such as flight tracking data in an automatic or semi automatic manner which little or no interaction of the user with the network. In other words, the user might not necessarily request updates of the flight tracking data. Rather, the data is update automatically. Such an update may be triggered by a change of the flight tracking data. The flight tracking data may comprise or consists of one or more data objects.

An improved data provision as well as an improved data exchange, in particular in an automatic or semi automatic manner is provided. Thereby, information provision and recognition for the user is improved, so that particularly the man machine interaction between the user and the system is improved.

The present application is not limited to the above described embodiments and examples. Rather, individual features of one or more of the above described examples/embodiments may be combined to create one or more further examples/embodiments. In that respect, the description relating to one or more of the above examples may also be applicable, where possible, to the remaining examples/embodiments and/or additional embodiments. In particular, the description of FIGS. 1 to 8 may be applied to the examples/embodiments of FIGS. 9 to 15 and also FIGS. 16 to 19. As examples, without limiting the above description, the description of the LTN 102 is similarly applicable to the flight tracking logic 910. Moreover, the description of the NSE 104 is similarly applicable to the NSE logic 914. Consequently, the functions and/or method steps as described with reference to the cross-architecture flight tracking architecture according to FIGS. 1 to 8 may be similarly applied to the cross-architecture flight tracking architecture according to FIGS. 9 to 15.

What is claimed is:

1. A flight tracking method comprising:
   registering a subscriber endpoint device with a legacy telecommunication network;
   registering the subscriber endpoint device with a notification system extension to the legacy telecommunication network;
   accepting a flight tracking request comprising a flight identifier;
   receiving an airline service flight update at the legacy telecommunication network;
   after receiving the airline service flight update, inserting, into an existing contact list associated with the subscriber end point device, a flight contact entry linked to the flight identifier to obtain an updated contact list, wherein the existing contact list stores a plurality of contact entries, each contact entry being associated with a contact from which the subscriber endpoint device accepts messages;
   notifying the subscriber endpoint device through the notification system extension of the updated contact list including the flight contact entry;
   maintaining a flight status responsive to the airline service flight update;
   determining whether the subscriber endpoint device is present and available to communicate with the notification system extension;
   if the subscriber endpoint device is present and available to communicate with the notification system extension, communicating the flight status to the subscriber endpoint in a flight contact object status message for the existing contact list via the notification system extension; and
   if the subscriber endpoint device is not present and available to communicate with the notification system extension, communicating the flight status to the subscriber endpoint device as a Short Message Service (SMS) via the legacy telecommunication network.

2. The method of claim 1, further comprising:
   communicating a flight contact object notification message regarding the flight status to the subscriber endpoint device.

3. The method of claim 2, further comprising:
   determining a communication channel for communicating the flight contact object notification message to the subscriber endpoint device.

4. The method of claim 3, further comprising:
   sending the flight contact object notification message to the subscriber endpoint device through the communication channel.

5. The method of claim 3, where determining comprises:
   choosing a message service communication channel supporting the subscriber endpoint device through the notification system extension to the legacy telecommunication network.

6. The method of claim 5, where the message service communication channel comprises an Instant Message (IM) communication channel.

7. The method of claim 3, further comprising:
   choosing a message service communication channel supporting the subscriber endpoint device through the legacy telecommunication network.

8. The method of claim 7, where the message service communication channel comprises a Short Message Service (SMS) communication channel.

9. A flight tracking system comprising:
  a notification system extension to a legacy telecommunication network comprising:
    a subscriber service operable to register a subscriber endpoint device with the notification system extension;
  the legacy telecommunication network comprising:
    a legacy network presence register operable to register the subscriber endpoint device with the legacy telecommunication network;
    a gateway operable to accept a flight tracking request from the subscriber endpoint device, the flight tracking request comprising a flight identifier, and an airline flight status update;
    an orchestration module operable to:
      insert, into an existing contact list associated with the subscriber end point device and after receiving the flight tracking request, a flight contact entry linked to the flight identifier into an existing contact list for the subscriber endpoint device to obtain an updated contact list, wherein the existing contact list stores a plurality of contact entries, each contact entry being associated with a contact from which the subscriber endpoint device accepts messages; and
      maintain a flight status responsive to the airline service flight update;
    a legacy presence server operable to:
      initiate notification to the subscriber endpoint device of the updated contact list including the flight contact entry;
      determine whether the subscriber endpoint device is present and available to communicate with the notification system extension;
      if the subscriber endpoint device is present and available to communicate with the notification system extension, initiate communication of the flight status to the subscriber endpoint in a flight contact object status message for the existing contact list; and
      if the subscriber endpoint device is not present and available to communicate with the notification system extension, initiate communication of the flight status to the subscriber endpoint device as a Short Message Service (SMS) via the legacy telecommunication network.

10. The system of claim 9, where the legacy presence server is further operable to initiate communication of a flight contact object notification message regarding the flight status to the subscriber endpoint device.

11. The system of claim 10, where the legacy presence server is further operable to determine a communication channel for communicating the flight contact object notification message to the subscriber endpoint device.

12. The system of claim 11, where the legacy presence server is further operable to send the flight contact object notification message to the subscriber endpoint device through the communication channel.

13. The system of claim 11, where the legacy presence server is further operable to determine the communication channel by:
  choosing a message service communication channel supporting the subscriber endpoint device through the notification system extension to the legacy telecommunication network.

14. The system of claim 13, where the legacy presence server is further operable to choose a message service communication channel comprising an Instant Message (IM) communication channel.

15. The system of claim 11, where the legacy presence server is further operable to determine the communication channel by:
  choosing a message service communication channel supporting the subscriber endpoint device through the legacy telecommunication network.

16. The system of claim 15, where the legacy presence server is further operable to choose a message service communication channel comprising a Short Message Service (SMS) communication channel.

17. A product comprising:
  a memory comprising at least one code section for tracking flight information; and
  a processor in communication with the memory, wherein the at least one code section includes registration logic operable to cause the processor to:
    register a subscriber endpoint device with a legacy telecommunication network ; and
    register the subscriber endpoint device with a notification system extension to the legacy telecommunication network;
  wherein the at least one code section includes input logic operable to cause the processor to:
    accept a flight tracking request comprising a flight identifier; and
    receive an airline service flight update at the legacy telecommunication network;
  processing logic stored in the memory operable to:
    insert, into an existing contact list associated with the subscriber end point device and after receipt of the airline service flight update, a flight contact entry linked to the flight identifier into an existing contact list for the subscriber endpoint device to obtain an updated contact list, wherein the existing contact list stores a plurality of contact entries, each contact entry being associated with a contact from which the subscriber endpoint device accepts messages; and
    maintain a flight status responsive to the airline service flight update; and
  wherein the at least one code section includes output logic operable to cause the processor to:
    the subscriber endpoint device through the notification system extension of the updated contact list including a flight contact entry;
    determine whether the subscriber endpoint device is present and available to communicate with the notification system extension;
    if the subscriber endpoint device is present and available to communicate with the notification system extension, communicate the flight status to the subscriber endpoint device in a flight contact object status message for the existing contact list via the notification system extension; and
    if the subscriber endpoint device is not present and available to communicate with the notification system extension, communicate the flight status to the subscriber endpoint device as a Short Message Service (SMS) via the legacy telecommunication network.

18. The product of claim 17, where the output logic is further operable to cause the processor to communicate a flight contact object notification message regarding the flight status to the subscriber endpoint device.

19. The product of claim 18, where the processing logic is further operable to cause the processor to determine a communication channel for communicating the flight contact object notification message to the subscriber endpoint device.

20. The product of claim 19, where the output logic is further operable to cause the processor to send the flight contact object notification message to the subscriber endpoint device through the communication channel.

\* \* \* \* \*